United States Patent
Kwapisz

(10) Patent No.: US 12,246,614 B2
(45) Date of Patent: Mar. 11, 2025

(54) SYSTEMS, METHODS, PROCESSES, AND DEVICES FOR DELIVERING RENEWABLE ENERGY TO ELECTRIC VEHICLES USING AN UNCREWED BATTERY-RECHARGING VEHICLE

(71) Applicant: Kolbev GmbH, Zurich (CH)

(72) Inventor: Jakub Kwapisz, Zurich (CH)

(73) Assignee: Kolbev GmbH, Zurich (CH)

( * ) Notice: Subject to any disclaimer, the term of this patent is extended or adjusted under 35 U.S.C. 154(b) by 948 days.

(21) Appl. No.: 17/283,148

(22) PCT Filed: Oct. 3, 2019

(86) PCT No.: PCT/IB2019/001080
§ 371 (c)(1),
(2) Date: Dec. 22, 2021

(87) PCT Pub. No.: WO2020/074953
PCT Pub. Date: Apr. 16, 2020

(65) Prior Publication Data
US 2022/0118878 A1 Apr. 21, 2022

Related U.S. Application Data

(60) Provisional application No. 62/742,368, filed on Oct. 7, 2018.

(51) Int. Cl.
*B60L 53/68* (2019.01)
*B60L 53/126* (2019.01)
(Continued)

(52) U.S. Cl.
CPC .............. *B60L 53/68* (2019.02); *B60L 53/126* (2019.02); *B60L 53/35* (2019.02); *B60L 53/57* (2019.02); *B60L 2240/72* (2013.01)

(58) Field of Classification Search
CPC ........................................................ B60L 53/68
(Continued)

(56) References Cited

U.S. PATENT DOCUMENTS 9,592,742 B1 3/2017 Sosinov et al.
9,778,653 B1 * 10/2017 McClintock ........... G06Q 10/08
(Continued)

FOREIGN PATENT DOCUMENTS

| DE | 102015205811 A1 | 10/2016 |
| DE | 102016217615 A1 | 3/2018 |
| EP | 2962890 B1 | 5/2016 |

OTHER PUBLICATIONS

Wireless Power Transfer, Wikipedia, Sep. 11, 2018 (Sep. 11, 2018) XP055550449. Retrieved from internet: url:https://en.wikipedia.org/wiki/Wireless_power_transfer&oldid=859024997.
(Continued)

*Primary Examiner* — Jerry D Robbins
(74) *Attorney, Agent, or Firm* — Barnes & Thornburg LLP

(57) ABSTRACT

Described herein are systems, methods, processes, and devices for transferring energy from an uncrewed battery-recharging vehicle to an electric vehicle, such as a car. In one example, the uncrewed battery-recharging vehicle is delivered by a distribution vehicle close to the location of the electric vehicle. The uncrewed battery-recharging vehicle identifies the electric vehicle, properly aligns itself underneath the parked electric vehicle, and transfers energy to the rechargeable battery component of the electric vehicle.

19 Claims, 10 Drawing Sheets

(51) Int. Cl.
*B60L 53/35* (2019.01)
*B60L 53/57* (2019.01)

(58) Field of Classification Search
USPC .......................................................... 320/109
See application file for complete search history.

(56) References Cited

U.S. PATENT DOCUMENTS

| 10,399,461 | B1* | 9/2019 | Sosinov | B60L 53/68 |
| 2019/0210479 | A1* | 7/2019 | Bachmann | B60L 15/38 |
| 2019/0384290 | A1* | 12/2019 | Kuffner, Jr. | G05D 1/0088 |
| 2020/0177026 | A1* | 6/2020 | Sosinov | B60L 53/124 |
| 2020/0317077 | A1* | 10/2020 | Schaffer | B60L 53/305 |

OTHER PUBLICATIONS

International Search Report and Written Opinion for Application No. PCT/IB2019/001080 mailing date Mar. 7, 2020 (17 pages).

* cited by examiner

SYSTEMS, METHODS, PROCESSES, AND DEVICES FOR DELIVERING RENEWABLE ENERGY TO ELECTRIC VEHICLES USING AN UNCREWED BATTERY-RECHARGING VEHICLE

RELATED APPLICATIONS

This application claims priority to and the benefit of International Patent Application No. PCT/IB2019/001080, filed Oct. 3, 2019, and titled "Systems, Methods, Processes, and Devices for Delivering Renewable Energy to Electric Vehicles Using an Uncrewed Battery-Recharging Vehicle," which also claims priority and the benefit of U.S. Provisional Patent Application No. 62/742,368, filed Oct. 7, 2018, and titled "Systems, Methods, Processes, and Devices for Delivering Renewable Energy to Electric Vehicles Using an Uncrewed Battery-Recharging Vehicle," the contents of each of which is incorporated herein by reference in its entirety.

BACKGROUND

Electrification of transportation systems is one of the most promising solutions for alleviating the problems associated with pollution and global warming. Electric vehicles ("EVs") relate to electrification of the automotive powertrain, which means that at least some of the energy for moving the vehicle is derived from an onboard energy storage such as a rechargeable battery. There are several powertrain alternatives under development, each utilizing different energy storage solutions and sources of propulsion. In general, EVs may be divided into mild-hybrids, plug-in hybrids, and battery EVs. Key challenges to EVs utilization include the availability of charging stations, charging time requirements, cost of batteries, and range anxiety. Wireless charging of EVs is being developed, but has not been implemented in a broad scale.

Existing methods for charging and recharging EVs include users parking at or near a location where a charging station is present, and then physically connecting their EV to the charging station. Because charging station access is often limited and users often park their cars for longer than the time necessary to recharge their EV, charging stations are not utilized as efficiently as possible. Drivers of EVs may be unable to locate a charging station because they are already being taken up by vehicles that are charging or, even more annoying to the driver, vehicles that are fully charged. Moreover, their fixed physical location demands that users consider both their destination and their destination's closest charging station when considering where to park their EV if a recharge is necessary.

SUMMARY

Certain embodiments of the present disclosure provide systems for energy delivery to an electric vehicle (EV) including a rechargeable battery and a wireless charging receiver. The system includes an uncrewed battery-recharging vehicle ("UBRCV") having an energy storage device and a wireless charging transmitter for transferring electric power to the EV, and a distribution vehicle for carrying one or more UBRCVs. The system is configured to receive a request for energy for the EV, with the request including at least one of an amount of energy in the rechargeable battery of the EV and a current location of the EV. The system is also configured to provide the request to a server, send the distribution vehicle to the EV to receive the recharge based on the request, and deploy the UBRCV from the distribution vehicle near the EV to receive the recharge. Still further, the system is configured to confirm an identification of the EV to receive the recharge, move the UBRCV in proximity to the EV to receive the recharge and align the wireless charging transmitter of the UBRCV with the wireless charging receiver of the EV, transfer energy from the UBRCV rechargeable battery to the EV, and confirm one or more of: a time duration during which the energy transfer occurred or the amount of energy transferred from the UBRCV to the rechargeable battery of the EV.

In some embodiments, the system can be further configured to conduct a financial transaction based on the transfer of energy from the UBRCV rechargeable battery to the EV. The financial transaction can be conducted at least partially with blockchain. In some embodiments, the UBRCV can be charged from a renewable energy source. Additionally, or alternatively, the UBRCV can be configured to transfer energy to the EV using resonance wireless charging. The UBRCV can be configured to provide an energy transfer using a backup system such as a wired connection and/or an inductive connection. In some embodiments, the UBRCV can be configured to determine an amount of energy transferred to the EV and/or an amount of time elapsed during the transfer of energy to the EV. Additionally, or alternatively, the UBRCV can include a marker to assist the UBRCV in finding and aligning with the EV receiver, with the marker possibly being able to provide information about the location and/or positioning of the receiver.

Another exemplary embodiment of the present disclosure is an uncrewed battery-recharging vehicle ("UBRCV") for transferring electric power to other electric vehicles (EV). The UBRCV includes a central processing unit, an energy storage device, a wireless charging transmitter, a propulsion system, a sensor, a communication module, a location module, a battery management unit, and an energy receiving module. The central processing unit is coupled to a non-transitory computer readable medium that stores instructions for controlling a UBRCV. The wireless charging transmitter is configured to transmit energy from the energy storage device to an EV. The propulsion system is for moving the UBRCV with respect to the EV. The sensor is configured to detect surrounding obstacles and EVs. The communication module is for receiving information, and the location module is for determining the location of the UBRCV. Additionally, or alternatively, the location module can be for determining the location of the UBRCV. The energy receiving module is configured to receive energy from an external source and store the received energy in the energy storage device.

In some embodiments, instructions stored in the non-transitory computer readable medium can include instructions for the UBRCV to receive, using the communication module, a request to transfer energy to an EV, locate and identify the EV requesting the transfer, and determine a travel path for the UBRCV to the EV, based at least partially on at least one of the location of the EV, a location of a wireless receiver of the EV, and/or a location of any surrounding obstacles. The instructions can further include instructions for the UBRCV to navigate and move in proximity to the EV requesting the recharge, align the wireless charging transmitter with the wireless receiver of the EV, and transfer energy from the energy storage device of the UBRCV to the EV.

The UBRCV can include a movable alignment mechanism that can be configured to increase the efficiency of an energy transfer between the UBRCV and the EV. Additionally, or alternatively, the UBRCV can include at least one sensor configured to locate the EV and detect a wireless charging receiver of the EV. The UBRCV can include at least one processor connected to the sensors, and the processor can be configured to perform multiple operations and/or processes of the UBRCV. In some embodiments, the energy storage device of the UBRCV includes one or more of the following: a battery, a supercapacitor, an ultracapacitor, or a fuel-cell. The propulsion system can be driven by an electric motor, and, in at least some instances, the propulsion system can include a wheel. In some such embodiments, the electric motor can be integral to the wheel. The propulsion system can, in fact, include a plurality of wheels, with at least some of those wheels being configured to translate the UBRCV in any cardinal direction.

The UBRCV can include a structural unibody construction frame, and the unibody construction frame can include an integrated frame portion and/or a bodywork portion. In some embodiments, the UBRCV can include a structural frame and a body portion that defines a body-on-frame design such that the structural frame is separate from the body portion of the vehicle. Still further, in some embodiments, the UBRCV can include a frame defining a monocoque structure. Additionally, or alternatively, the UBRCV can include an external cover that defines an opening for access to the wireless charging transmitter. The external cover can be configured to protect the wireless charging transmitter.

In some embodiments the wireless charging transmitter can include one or more of an RF wireless transmitter, a laser transmitter, and/or an inductive charging module. The UBRCV can include a backup energy transmitter configured to establish a wired connection to the EV for transferring power to the EV. While many sizes, shapes, and configurations of the UBRCV are possible, in some embodiments the UBRCV can be approximately equal to or less than about 1550 millimeters wide, approximately equal to or less than about 2500 millimeters long, and approximately equal to or less than about 180 millimeters in height.

Yet another exemplary embodiment of the present disclosure is a method for delivering energy to an electric vehicle (EV). The method includes receiving a request for energy for the EV, deploying an uncrewed battery-recharging vehicle ("UBRCV") near the EV to receive energy, and confirming an identification of the EV to receive energy. The method further includes moving the UBRCV in proximity to the EV to receive energy such that the UBRCV is in a position to provide energy to the EV and transferring energy from the UBRCV to the EV.

The method can further include sending a distribution vehicle to the EV to receive energy. In some embodiments, moving the UBRCV in proximity to the EV to receive energy can further include aligning a wireless charging transmitter of the UBRCV with a wireless charging receiver of the EV.

The method can further include confirming one or more of: a time duration during which the energy transfer occurred or the amount of energy transferred from the UBRCV to the EV. The method can further include initiating a financial transaction based on the transfer of energy from the UBRCV to the EV. In at least some such instances, the financial transaction can be conducted at least partially using blockchain. Transferring energy from the UBRCV to the EV can include using resonance wireless charging. In some embodiments, the method can include determining an amount of energy transferred to the EV and/or an amount of time elapsed during the transfer of energy to the EV. The method can further include determining a travel path for the UBRCV to the EV. Such determination can be based, for example, at least partially on at least one of a location of the EV, a location of a wireless receiver of the EV, and/or a location of any surrounding obstacles.

DETAILED DESCRIPTION

Figure 1:
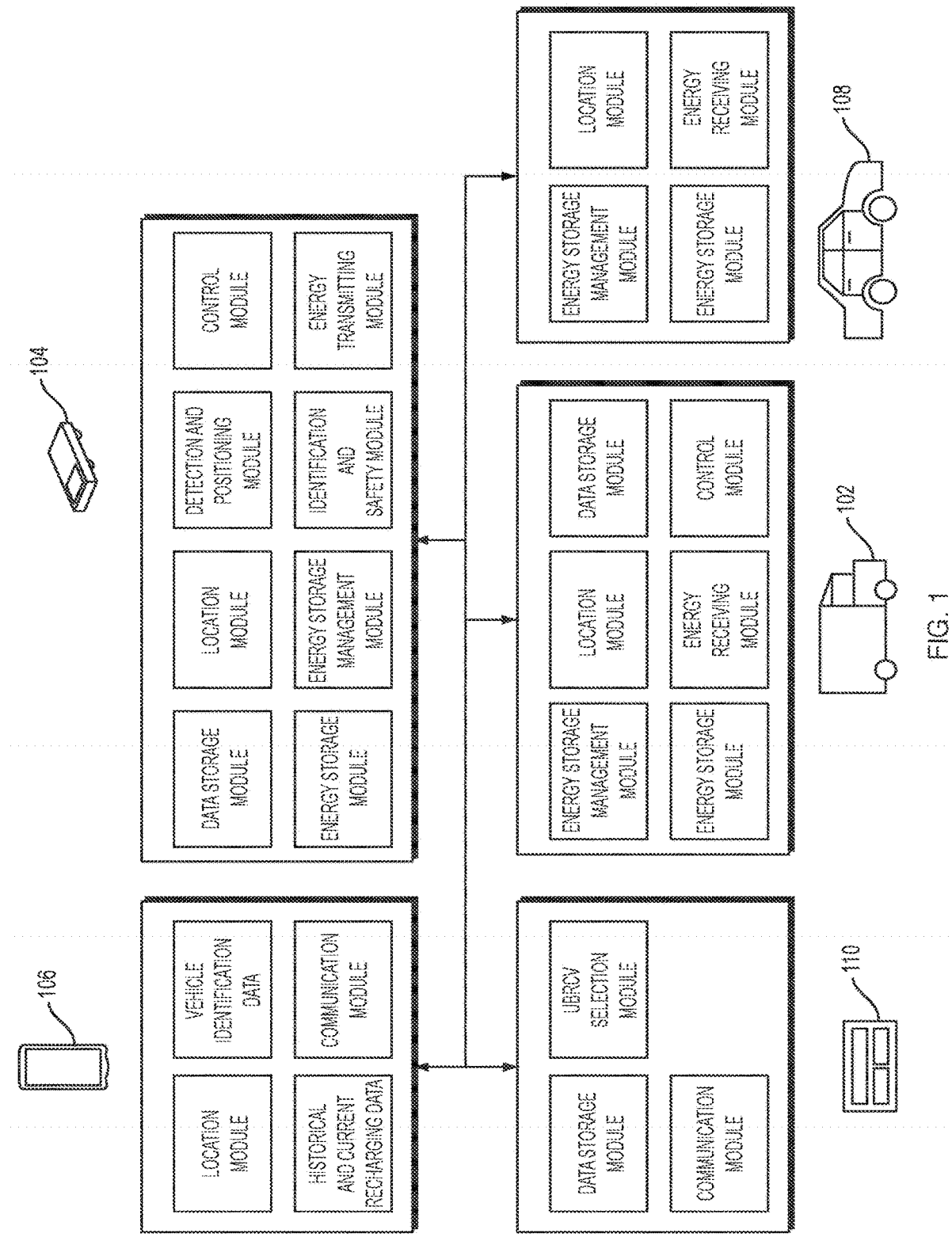
FIG. 1 is an illustration of certain aspects of an example system for providing energy to an electric vehicle ("EV") using an uncrewed battery-recharging vehicle ("UBRCV").

Certain aspects of the present disclosure relate to systems, devices and methods for delivering renewable energy using an uncrewed battery-recharging vehicle ("UBRCV") to an electric vehicle ("EV") such as a passenger car, bus, truck, construction, industrial and/or agriculture machinery, or aerial electric vehicles, such as drones, etc. An uncrewed vehicle is a vehicle that does not include a crew (e.g., one or more persons). Predicted use case scenarios anticipate that the wireless charging of vehicles will occur at fixed locations, including at the home of the EV owner, in specially designated parking lots, at a workplace, or via in-road technologies that provide electrical power to the vehicle while the vehicle is in route. Infrastructure for such solutions is very expensive to create and maintain. In addition, the efficiency of a wireless power transfer system is one consideration, as energy losses in the course of wireless transmission of power should be minimized to reduce waste and cost. In some examples or embodiments (the terms are generally used interchangeably herein), to achieve a desired efficiency of energy transfer, a wireless charging system for EVs may require a transmitter and a receiver being aligned with each other within a certain degree, and, in some examples, adequate alignment of transmitter and receiver within an EV wireless charging system requires complex and time-consuming positioning. For example, precisely parking an EV (having a wireless receiver) within a parking space (having a wireless transmitter). Because of these many challenges, there exists a need for new systems, methods, processes, and devices for providing wireless power to EVs. Examples of the UBRCV discussed herein utilize renewable energy and alleviate many of the problems associated with EV charging. Additionally, by reducing dependency on fossil fuels such as coal, oil and gas currently in use in many countries to generate electricity for EVs, the proposed innovation may have a favorable impact on reducing regional pollution or even global warming.

Examples of the UBRCV include one or more types of rechargeable energy storage devices that captures and provides energy to perform internal processes, as well as the main task of recharging an EV when requested. In some examples, the energy storage device uses one or more electric, chemical, or mechanical devices to store energy. In one example, the UBRCV's energy storage device is an onboard battery and, during use of the UBRCV, energy is drawn from batteries and delivered to the EV. In some examples, the UBRCV includes systems to manage the batteries of the UBRCV. In some implementations, the UBRCV monitors the amount of energy available from the energy storage device. In some implementations, the UBRCV automatically determines whether there is a need for the UBRCV to be recharged. Another option is for information about the amount of the energy available in the energy storage device to be sent to a remote server or an operator. In some implementations, the UBRCV recharging decision is based on one or more different factors such as, for example, schedule and routing, etc.

In some examples, the UBRCV includes a mobile ground machine configured to operate in one or more manually controlled, remotely controlled, semiautonomous or autonomous modes. In a manual mode example, the operator places and aligns the UBRCV at a desired location and initiates the electricity transfer with physical contact. In a remotely controlled mode example, a UBRCV operator remotely moves and aligns the UBRCV, and remotely initiates an electricity transfer without physically contacting the UBRCV. In a semi-autonomous mode example, the UBRCV performs one or more operations autonomously, such as: route selection, route navigation, route piloting, alignment of the UBRCV at the desired location, initiation of the electricity transfer, and requesting recharging, but may also require some human intervention with one or more of these operations or other operations. In a fully autonomous mode example, the UBRCV is configured to manage route selection, route navigation, route piloting, and alignment of the UBRCV at the desired location, initiate the electricity transfer, request recharging, and other operations, without human intervention.

In some examples, the UBRCV transfers energy to an EV, such as a passenger car, bus, truck, construction, industrial, and/or agricultural machinery, aerial electric vehicles, such as drones, or the like. In some examples, the EV includes a rechargeable energy storage device that captures and provides energy to perform processes for the EV, when needed. In some examples, the energy storage device uses one or more of electric, chemical, or mechanical devices to store energy for proper functioning of the EV. In some examples, the energy storage devices include one or more batteries that supply electric energy to the EV, and, during use of the EV, energy is drawn from the batteries. In some examples, the EV includes systems to manage the batteries of the EV. In some implementations, the EV monitors the amount of energy available from the energy storage. In some examples, the EV automatically determines whether there is a need for the EV to receive energy. In other implementations, information regarding the amount of available energy in the energy storage device is sent to a user application or other remote device. Subsequently, a user, based on their preference and schedule, is able to request to receive energy from a UBRCV. In other examples, in the event that the EV is in an autonomous mode and is aware of the user's schedule, or its own schedule, the EV is able to generate a charging request by itself. In some examples, charging request data is apart from the state of the battery and includes additional information regarding, for example, a type or model of the EV, any modifications made to EV, the EV's parking location, previous and future charging requests, EV sensor information, and other information regarding the EV. It is also conceived that charging occurs at more than one location, such as when future locations and duration of EV parking are included in the charging request data. In some examples, the EV or user provides the charging request data that is received by the server. In some examples, the server is programed to automatically select a one or more UBRCV from multiple available UBRCVs, or the selection is done by an operator at the control center. In some examples, more than one UBRCV is utilized in those cases when a single UBRCV will not be enough to fulfill the charging request.

In some examples, the server is configured to select a particular UBRCV based on one or multiple criteria. In the same manner, in some examples, the operator uses one or multiple criteria to select the most optimal UBRCV for a given charging request. For example, the criteria may be, but are not limited to, the selection of an UBRCV based on distances between a distribution vehicle for UBRCVs and the EV to be charged, the UBRCVs and the EV to be charged, a state of the charge of various UBRCVs, charging speeds supported by the UBRCVs, a state of charge of the distribution vehicle for UBRCVs, future already planned route of the distribution vehicle for UBRCVs, source of energy stored in the batteries, etc.

In certain aspects, once the server or operator determines the distribution vehicles for UBRCVs to select and which UBRCV or multiple UBRCVs will be used for charging, the charging task instructions are sent to selected UBRCV units. The distribution vehicle for the UBRCVs travels to location of the parked EV, the point at which the transfer of energy may occur. In some examples, charging occurs at more than one location, for example, in cases where the future locations and duration of EV parking are known. In some cases, when the EV will not be parked long enough to allow the transfer of sufficient energy, the UBRCV drives under the EV to continue charging the vehicle. In some examples, the UBRCVs use onboard as well as EV sensor information for multiple actions. For example, to adjust a route to a parking location, align receiver and transmitter for optimal charging efficiency, confirmation that a requesting vehicle is at the determined parking location, and monitor the battery health of electrical vehicle and UBRCVs.

To ensure that the correct EV will be charged, multiple authentication techniques may be used before charging commences. In one example, the UBRCVs execute a first authentication based on information acquired from an onboard optical sensor such as, for example, a camera. In some examples, authentication is done via a comparison of information received from the optical sensor with information stored in a database on a server. If an operator of a distribution vehicle for UBRCVs is present, the operator may check the license plate and description of the vehicle and compare it with the information sent during the charging request, if present. Once the UBRCV is under the EV, the UBRCV may find and identify if a pattern, marker, and/or identifier (e.g., a barcode, QR-code, ARTag, AprilTag, or CALTag) match a corresponding entry from the database. In some examples, other types of identification are also being used to guide the UBRCV for correct alignment of the transmitter with the EV receiver, such as beacons, Bluetooth sensors, radio-frequency identification ("RFID"), Bluetooth Low Energy ("BLE"), near-field communication ("NFC"), or other similar location means. In some examples, authentication processes protect the UBRCV from connecting with devices controlled by malicious users. The EVs may also be protected from connecting with devices pretending to be UBRCVs trying to acquire information and/or energy from the EV. Information from the EV may include but is not limited to the payment details, schedule, sensor information and other users' private data.

Once the UBRCV transmitter is aligned with the EV receiver, the UBRCV is able to transfer energy to the EV. In some examples, confirmation processes are also being used to confirm whether energy is being transferred between the UBRCV and the EV, as well as an amount of energy that is transferred between the UBRCV and the vehicle. Based on the information it is estimated how much energy will be transferred during the predetermined charging time and what percentage of the total EV battery capacity will be recharged.

Termination of the recharging process can be accomplished in multiple ways. In some aspects, termination is triggered by the expiration of the requested charging time. Other example triggers include, but are not limited to, the EV being started before the defined charging time, a living object being present in the electromagnetic field, the battery of the EV being full, or issues with the EV during the charging process, etc.

A payment process may be carried out for the transfer of energy from the UBRCV to the EV. In some implementations, payment process information for the payment process includes the time it took to transfer the energy, the source of the energy that was transferred, the amount of energy that was transferred, energy transfer conditions, and other parameters related to the energy transfer or information necessary to conduct the payment process. An example, automated payment process includes the creation of a payment request and the transfer of currency between stored value accounts. In some implementations, the transfer of currency includes credit cards, tokens, virtual currency, cryptocurrency, or other stored value indicators being used to facilitate the transfer between user and service provider accounts. In some examples, transaction information, tracking assets as well as other processes previously mentioned is decentralized with usage of blockchain technology.

Certain aspects of the present systems, methods, processes, and devices for delivering renewable energy to EVs using an UBRCV vehicle provide numerous benefits. For example, benefits related to:

Convenience: Recharging of an EV with a UBRCV is able to be performed without driver intervention and operation.

Environment: Implementations of the UBRCV are able to provide assurance of recharging via a renewable energy source decreasing local and regional pollution.

Safety: Charging station cables and connectors may not be needed with a UBRCV, thereby reducing the hazards of cables, plugs, or sockets especially when exposed to moisture or water in an outdoor environment.

Cost: Aspects of the UBRCV system provide a cost effective alternative to installing and maintaining an expensive charging station in a housing unit.

Vandalism resistant: With a UBRCV, there may be no visible nor easily accessible sockets, cables, and plugs reduces vandalism and accidental damaging.

Availability: The UBRCV increases availability of charging options on the market for users, which may increase consumer demand for EVs.

Public space aesthetic: UBRCVs reduce reliance on public charging stations and unsightly cables, which may allow for alternative use of public space.

Sale of renewable energy: UBRCVs are able to be charged with renewable energy, which may be sold to another system user. Without this option, for example, excess energy could be lost.

FIG. 1 is an illustration of certain aspects of an example system for providing energy to an EV using an uncrewed battery-recharging vehicle. The system may include a distribution vehicle for UBRCVs 102, an uncrewed battery-recharging vehicle ("UBRCV") 104, cell phone with application or other remote device 106, an electric vehicle ("EV") 108 and a server 110. FIG. 1 is an illustrative model. In some cases, the system may include more than one of each of the devices in the system.

The EV 108, which may also be called a battery electric vehicle ("BEV"), plug-in hybrid electric vehicle ("PHEV"), neighborhood electric vehicle ("NEV"), electromotive vehicle ("xEV"), aerial electric vehicle ("AEV"), drone, construction, industrial, and/or agricultural machinery, etc., is a mobile machine that uses electric energy to move from one location to another. In some examples, the EV 108 is a road vehicle, water vessel, aircraft or other vehicle having an electric power storage device. In some implementations, the EV 108 is used for personal transportation, transport of goods, performing industrial or agricultural tasks, etc. In some examples, the EV 108 is controlled by a driver, or operates with different levels of autonomy (e.g., with or without driver, or partial driver intervention). In some examples, an EV 108 uses at least one electric motor for propulsion. In some examples, an EV 108 contains an energy storage module, solar panels, an electric generator or a combination.

In some examples, EV 108 includes a location module configured to determine the location of the vehicle. In some examples, the vehicle location data comprises one or more of the following: the location of the EV 108 at a current time, the location of desired parking for the EV 108 at a future location and time at which the EV 108 is expected to be, the expected route the EV 108 will take, or the like.

The EV 108 includes one or more energy storage devices. In some examples, the energy storage device in the EV 108 is one or more of various battery types (e.g., Lithium Ion, Metal Air, Lithium Ion Polymer, Magnesium Ion, Nickel-Metal Hydride, solid state, and more), capacitors, super capacitors, fuel cells, flywheels or other energy storage devices known to one skilled in the art, or a combination of them.

In some examples, the electric vehicle 108 includes an energy-receiving module. In some examples, the energy receiving module for EV 108 includes one or more apparatuses configured to receive energy from the UBRCVs 104. For example, the energy-receiving module is integrated with the EV 108, or the energy receiving system comprises a separate apparatus that may be retrofitted to the EV 108. For example, the energy-receiving module may be built within the body of the EV 108 at the time of manufacturing, or the energy receiving system may be an aftermarket mechanism installed onto the EV 108. In some examples, the energy receiving system mounts onto various components of the EV 108 such as the underbody, chassis, body-in-white, and battery pack. In some examples, the energy-receiving module includes one or more receivers. The energy-receiving module, for example, enables the EV 108 to receive the energy from the UBRCVs 104. The EV 108 may be taken to a service shop, which installs the energy receiving module and all other necessary equipment including electromagnetic shield. In some implementations, electromagnetic shielding is present to prevent magnetic fields from penetrating the interior of the EV 108 or the energy storage. As such, installation of electromagnetic shielding between the receiver and the EV 108 may be required.

In some examples, the EV 108 energy-receiving module is also configured to transmit the energy. For example, if the EV 108 has an excess amount of energy that the user would like to give away or sell, the excess energy is transferred to the UBRCVs 104. For example, the server or the operator may dispatch the UBRCVs 104 to acquire the excess energy stored in the EV 108 and deliver that acquired energy to another EV 108 based on a request for energy. The energy that was acquired by the UBRCVs 104 from the EV 108 may then be able to be applied as an agreed payment or credit to the user against future charges.

Certain aspects of the UBRCV 104 can include a mobile ground machine configured to operate in one or more manually controlled, remotely controlled, semiautonomous or autonomous modes. In a manual mode example, an operator can place and align the UBRCV 104 at a desired location and initiate an electricity transfer with the physical contact. In a remotely controlled mode example, the UBRCV 104 operator can place and align the UBRCV 104 at the desired location and initiate the electricity transfer without physical contact. In a semi-autonomous mode example, the UBRCV 104 is able to perform certain operations and processes autonomously, for example: route selection, route navigation, route piloting, aligning the UBRCV 104 at the desired location, and initiation of an electricity transfer. In such instances, however, the UBRCV 104 may also require some human intervention. In a fully autonomous mode example, the UBRCV 104 can be configured to manage the various operations and processes (e.g., route selection, route navigation, route piloting, aligning the UBRCV 104 at a desired location, and initiation of an electricity transfer) without human intervention.

Certain aspects of the UBRCV 104 include one or more energy storage devices. Example energy storage in the UBRCV 104 can include various battery types (e.g., Lithium Ion, Metal Air, Lithium Ion Polymer, Magnesium Ion, Nickel-Metal Hydride, solid state, and more), capacitors, super capacitors, ultra-capacitors, fuel cells, flywheels or a combination of them. Even though energy storage is a function of the UBRCV 104, in some examples, a modular design may be used to allow battery swapping or replacement. In some examples, an energy storage in the UBRCV 104 is charged from an external source. In some implementations, the energy stored may be generated with usage of renewable energy (e.g., solar, wind, hydro, thermal and so forth).

In some examples, the UBRCV 104 is constructed to be light in weight and have limited capabilities compared to an EV 108 or the distribution vehicle for UBRCVs 102. For example, the UBRCV 104 may have limited range, may weigh less than regular passenger vehicle, and may be configured to drive with limited speed. The UBRCV 104 may be owned by the service operator, private fleet operators or commercial customers as well as private customers. For example, a service operator may use the UBRCV 104 to fulfill recharge EV orders placed by any customer. In another example, an individual may own the UBRCV 104 for use recharging a limited or restricted number of EVs 108 such as a private fleet, community, association, members or other group of users.

Certain aspects of the UBRCV 104 include a location module configured to determine the current position of the UBRCV 104. The location module generates, for example, location data representative of the location of the UBRCV 104. In some examples, the location data includes of one or more of the following: the location of the UBRCV 104 at a current time, a future location and time at which the UBRCV 104 will be either charging or receiving energy from the EV 108, and an expected route or path the UBRCV 104 may take to get back to the distribution vehicle for UBRCVs 102 or to the next EV 108. The UBRCV 104 location module may generate the vehicle location data based on one or more sensors. These sensors may include satellite-based navigation systems, radio position finding systems, inertial positioning and surrounding recognition sensors, network positioning systems, tags and so forth. The satellite-based navigation system may include one or more Global Positioning System ("GPS") receivers, a global navigation satellite system ("GLONASS") receiver, a Galileo receiver, an Indian Regional Navigational Satellite System and so forth. The vehicle location data may include any suitable data indicative of a location. The location may be specified in terms of latitude and longitude, street address, position relative to known well-defined objects and so forth.

In some examples, distinct from location module, the UBRCV 104 includes a separate detection and positioning module. In some examples, the detection and positioning module includes one or more sensors detecting inertial positioning as well as surrounding recognition sensors such as acceleration sensors, gyroscope, motion sensors and rotation sensors. In some examples, the detection and positioning module calculates the position of the UBRCV 104 based on integration of these sensors relative to reference points. In some examples, the system also determines the location of the UBRCV 104 by calculating the distance traveled from the distribution vehicle by the UBRCVs 102. In some examples, the detection and positioning module also determines the location of any internal or foreign objects in the system by receiving information from one or more location sensors such as through RFID, NFC sensor, acoustic or optical sensor and so forth. Foreign objects also may be detected by the changes in the electromagnetic field. When the foreign object is alive or potentially harmful to the system then necessary actions may be taken for a non-limiting example adjustment to the energy transfer.

Certain aspects of the UBRCV 104 may include an energy storage management module configured to manage the energy storage device. For example, the energy storage management module may monitor the amount of energy available in the energy storage device. In some examples, based on this monitoring, it is possible to determine if the UBRCV 104 is able to fulfill the energy needs of current or upcoming re-charging requests. In some examples, based on the rate of energy consumption during the EV 108 recharging and the current amount of energy available, the energy storage management module may determine that the energy will be depleted within few minutes or hours. In this case, the distribution vehicle for UBRCVs 102 may be requested to pick up the nearly discharged UBRCV 104 to replace it with another fully or partially charged UBRCV 104 to finish the charging request. In some examples, the energy storage management module may determine that the amount of energy that will be left in the UBRCV 104 will be sufficient to fulfill an upcoming re-charging request. Additionally, the energy storage management module may be able to be used to determine how long the UBRCV 104 charging will take. In some examples, the energy storage management module may be configured to monitor the amount of energy delivered to UBRCV 104 and delivered to or from the EV 108 during energy transfer. Monitoring may indicate an amount of electric energy transferred measured in joules, watts, kilowatt hours, coulombs or other suitable units. Additionally, the actual time during which energy transfer occurs is measured and stored. Data gathered by monitoring the amount of energy delivered and the time during which charging occurs, may be used to bill or credit the user, etc.

Certain aspects of the UBRCV 104 include a data storage module. In some examples, historical energy consumption and depletion data are generated by the energy storage management module and stored in the data storage module, or it may be received from other devices or systems. The data in the data storage module may include a usage history, the type of energy stored, current energy level, potential capacity, charging speed, self-discharge rate, temperature, and so forth.

Recent developments in the area of automotive software, autonomous drive, specifically the advancement of deep learning require large amounts of training data and raise problems connected with the transmission and storing of that data. Raw or processed sensor information (such as camera, cameras, radars, Light Detection and Ranging (LiDAR), telematics etc.) can produce more than 3 TB of data per day per vehicle. Data from the EV 108 can be transmitted to the UBRCV 104 and transmitted from the UBRCV 104 to the delivery vehicle 102 and/or the server 110 and/or the cloud. Embodiments can also include storing data in the UBRCV 104 and/or the delivery vehicle 102 and sending the data when the UBRCV 104 is charged, and/or at any time during the described process. The data can be stored in a hard drive, which can be physically removed from the UBRCV 104, or other storage techniques known to those skilled in the art can be used. In some instances, the data may be needed for additional validation and algorithm training. In some cases, software of the EV 108 may be updated by transferring it from the UBRCV 104 to the EV 108. This way, there will be no need to do any updating in a service center, and unauthorized access can be prevented.

In some examples, the UBRCVs 104 data storage module includes one or more memory components. In some examples, the memory includes at least one operating system, computer readable instructions, data structures, program modules, and other data for the operation of the UBRCVs 104. In some examples, the operating system and program modules are configured to manage hardware resources such as the interfaces, the devices, modules, and systems. In some examples, the interface module is configured to provide a user interface to a user cell phone with application or other remote device 106, the UBRCVs 104, the operator, the server 110 or distribution vehicle for UBRCV 102. The user interface may be an application or a web interface presented via the network accessible to the user. The user interface enables communication such as sending charging requests to at least one of the UBRCVs 104, EV 108, server 110, or distribution vehicle for UBRCVs 102. The user interface may be presented using one or more output devices such as a display on a cellphone, laptop, computer, dashboard, haptic generator, audible communication and so forth. The data storage module may support the control module. In some examples, the control module is configured to manage various components, devices, assemblies, or modules of the UBRCVs 104. In some examples, the UBRCVs 104 control module manages the steering system by controlling servomotors, motors, etc. based on inputs received from an operator, predefined program, or autonomous drive module. In some examples, the control module manage systems and components such that the UBRCVs 102 operates fully autonomously or semi-autonomously. In some examples, the program on the control module is configured to perform automatic braking, slow down, acceleration, multi-directional turns, and movement forward or backward, etc.

In some examples, the energy transmitting system is configured to provide energy to the EV 108, or receive energy from EV 108 using wireless energy transmission. In some examples, the UBRCV 104 includes the energy-transmitting module. There are many wireless energy transmission techniques such as: Inductive Charging, Electromagnetic Radiation, Resonance charging, Radio Frequency, Laser Wireless Charging, etc. Some techniques allow near and far-field wireless energy transmission. The wireless energy transmission system described herein may use, but is not limited to, wire loops (i.e., multi-turn coils) forming a resonant structure that is capable of efficiently coupling energy from a primary coil (transmitter) to a secondary coil (receiver) via the magnetic near field if both primary and secondary coils are tuned to the same resonance frequency. This method is also known as "resonant inductive coupling," "magnetic phase synchronous coupling," "magnetic coupled resonance," "resonant induction," etc. One reason for relying on a magnetic field is its low interaction with non-conductive materials in the proximity of the transmitter and receiver, reducing system safety concerns.

In some examples, wireless energy transmission is based on coupling between a transmitter on the UBRCV 104 and a receiver embedded in the EV 108. This approach can use any of the mentioned wireless charging techniques depending on the current requirements and needs. In some examples, inductive charging is the least preferable wireless energy transmission technique because it has the disadvantage that the spacing between transmitter and receiver must be very small (e.g., within millimeters) as well as the precise alignment between transmitter and receiver needed to be assured for efficient charring. In some examples, efficiency is of importance in a wireless power transfer system due to the losses, which can occur in the course of wireless transmission of power. Efficiency problems related to energy transmission technologies have inhibited their wide application in EVs, particularly since it is not easy to park the vehicle to assure correct alignment leaving a few millimeters gap. As a result, there is a need for systems, methods, processes and devices to provide wireless power to EVs. Certain aspects of the present disclosure overcome this challenge because the UBRCV 104 is designed to precisely move under the vehicle and align the transmitter to the receiver in EV 108, to be in the optimal "near-field" position. Additionally, in some examples, the UBRCV 104 transmitter and the EV 108 receiver are configured to sustain a very similar or equal resonant frequency to ensure that transmission efficiency is maximized. Single and/or multi-turn loop antennas may be used for both transmitting and receiving, and, in some instances, may be used for bidirectional energy transmission between the UBRCV 104 and the EV 108.

Fine-tuning of the alignment of the transmitter and receiver after the EV has been parked in a regular parking space may be possible. In some examples, if needed, the optimal spacing or alignment along any axis is be assured by the mechanical device onboard the UBRCV 104. For example, the transmitter on the UBRCV 104 may be moveable to bring it into better alignment with the receiver. The distance between the transmitter and receiver may need to be reduced in order to improve magnetic coupling for fast, efficient, and safe energy transfer.

In some examples, the UBRCV 104 includes the identification and safety module. In order to confirm that the correct EV will be charged, multiple authentication techniques may be used before the charging begins. For example, the UBRCV may execute a first authentication based on information acquired from an onboard optical sensor such as a camera. Some sensors such as, for example, a camera may be shared with other modules such as, for example, the detection and positioning module. In some examples, authentication may be done via comparison of the information received from the optical sensor with the information stored in the database on the server 110 or in the data storage module. The operator of a distribution vehicle for UBRCVs may check the license plate and description of the vehicle and compare it with the information sent during the charging request, if present. In some examples, once the UBRCV 104 is under the EV, the UBRCV is able to find and identify a pattern such as a barcode or QR code and match it with that contained in the database on the server 110 or in the data storage module. In some examples, other types of identification may also be used, such as beacons, Bluetooth sensors, RFIDs or others. Authentication processes are used to the protect UBRCV 104 from connecting with devices controlled by malicious users. EVs may also be protected from connecting with devices pretending to be UBRCVs attempting to acquire information from the EV. An additional function of the identification and safety module may be to provide assistance in guiding the UBRCV 104 for correct alignment and transmission with the EV receiver. Combined information from the sensors and other modules may be also used to determine the UBRCV 104 theft or damaging attempt. For a non-limiting example based on the information from camera and location module, it is possible to detect unauthorized movement of UBRCV 104 or movement of other objects around it. Gyroscope, pressure sensor, or other sensors may detect an elevated force applied to the UBRCV 104. Data about such events may be stored or communicated to other objects in the system or directly to authorities such as police.

Certain aspects of the distribution vehicle for UBRCVs 102 can include a mobile ground machine configured to operate in one or more manually controlled, remotely controlled, semiautonomous, or autonomous modes. In a manual mode example, the operator can drive the distribution vehicle for UBRCV 104 from the charging station to the proximity of the parked location of EV 108. In a remotely controlled mode example, the operator can control the distribution vehicle for UBRCVs 102 from a control station and can remotely drive it from the charging station to the proximity of the parked location of EV 108. In a semi-autonomous mode example, the distribution vehicle for UBRCVs 102 can perform route selection, route navigation, route piloting, and drive to the proximity of at the parked location of EV 108. In such instances, however, the UBRCV 102 may also require some human intervention. In a fully autonomous mode example, the distribution vehicle for UBRCVs 102 can be configured to manage the various operations and processes (e.g., route selection, route navigation, route piloting, and/or driving to the proximity of the parked location of EV 108) without human intervention. In some embodiments, the distribution vehicle for UBRCVs 102 can be used to transport the UBRCV 104 to the proximity of the parked location of the EV. In some embodiments, after the recharging of the EV 108 is finished, the distribution vehicle for UBRCVs 102 can be used to collect the UBRCVs 102. In some embodiments, after collecting the UBRCVs, the distribution vehicle for UBRCVs 102 may continue in route to deliver the same or another UBRCV 104 to the proximity of the parked location of EV 108. Another option is that the distribution vehicle for UBRCVs 102 may continue the route to collect additional UBRCVs 104 from to the proximity of the parked location of another EV 108. In some embodiments, the distribution vehicle for UBRCVs 102 may also return fully or partially discharged UBRCVs 104 to the charging station 112. The decision can depend on an algorithm and/or operator input and can be changed depending on circumstances.

Certain aspects of the distribution vehicle for UBRCVs 102 include a location module. In some examples, the location module generates location data representative of the location of the distribution vehicle for UBRCVs 102. The location data may comprise one or more of: the location of the distribution vehicle for UBRCVs 102 at a current time, the location of the desired parking space of the EV at a future location and time at which the EV 108 is expected to be and for which the distribution vehicle for UBRCVs 102 was selected, or the location of the UBRCVs 104 for which the distribution vehicle for UBRCVs 102 was selected to pick up.

In some examples, functions of other modules in the distribution vehicle for UBRCVs 102 are similar to the same type of module in the other objects in the system, but adapted and dedicated to the function of the distribution vehicle for UBRCVs 102.

Communication between the elements and devices is one aspects of the overall system. In some examples, some or all of the elements and devices such as the distribution vehicle for UBRCVs 102, the UBRCV 104, cell phone with application or other remote device 106, EV 108 and server 110 may communicate with each other. Example communication networks (not shown) may include a local network, a wide area network ("WAN"), global system for mobile communication ("GSM"), 3G, 4G and 5G, broadcast network, a personal area network ("PAN"), a wired and wireless local area network ("LAN"), Wi-Fi, Bluetooth, and so forth. In some implementations, the devices and systems described herein are configured to communicate indirectly and in others to directly connect to each other. A satellite-based navigation system may use signals provided at least in part by orbital satellites to generate the location of the receiver that may be in the UBRCVs 104. Network positioning may involve utilizing one or more cellular network access points to determine position based at least in part on radio frequency signal strength, or association of a network address or access point with a previously determined location, and so forth.

Certain aspects of the UBRCVs 104 include a control module composed of one or more hardware processors configured to execute instructions. In some examples, the UBRCVs 104 control module includes one or more input/output interfaces that enables a system, module or other element to communicate with one or more other devices. In some examples, the UBRCVs 104 control module also includes one or more communication interfaces. In some examples, the communication interface is configured to provide communications among other components such as UBRCVs 104, the EV 108, server 110, the distribution vehicle for UBRCVs 102, other web-based resources, routers, wireless access points, network access satellites, cellular towers, and so forth. The communication interfaces may include wireless functions and devices configured to couple to one or more networks including LANs, Wireless-LANs, WANs, Wireless-WANs, and so forth. In some examples, collision avoidance and path selection and routing is a function of the control module. In some examples, the UBRCVs 102 control module executes a program or series of programs to improve the safety of the UBRCVs 102 as well as the safety of its surrounding and, especially, living objects. In yet other examples, the UBRCVs 102 control module receives inputs from and manage components and systems such as motors, optical sensors, acoustic sensors, acceleration sensors, gyroscopes, motion sensors and rotation sensors. One of the objects in the system, for example the UBRCVs 104, server 110, or distribution vehicle for the UBRCVs 102, may request the sensor data from the EV 108 while it is parked or from the time the EV 108 started the parking maneuver up to the full stop in the parking space, and driving off from the parking space. Based on this information the UBRCVs 102, the distribution vehicle for UBRCVs 102, the server 110, or the operator may determine the best location for the distribution vehicle for UBRCVs 102 to deploy the UBRCVs 102 as well as the path for the UBRCVs 102 to take while aligning with the EV 108 receiver. In this example, based on data from the data storage module and the control module, the algorithm on the server is able to send a warning to the operator that for some reason the charging may be challenging, or require the performance of some unusual task, or not be possible at all. For example, the EV 108 may travel without a problem on a sidewalk curb or drive over a rock or other obstacle which, in such instances it may not be possible for the UBRCVs 102 to secure an optimal charging position. In some examples, when these events occur, an operator can perform additional actions such as removing any obstacles or may have to use additional tools, objects, and equipment. Additional elements monitored include, for example, the type of road, parking space, and road surface conditions. Additional information includes, for example, road and parking space changes based on weather related conditions such as water accumulation due to rain, snow, or ice as well as obstacles caused by dust or rocks, etc.

Figure 2:
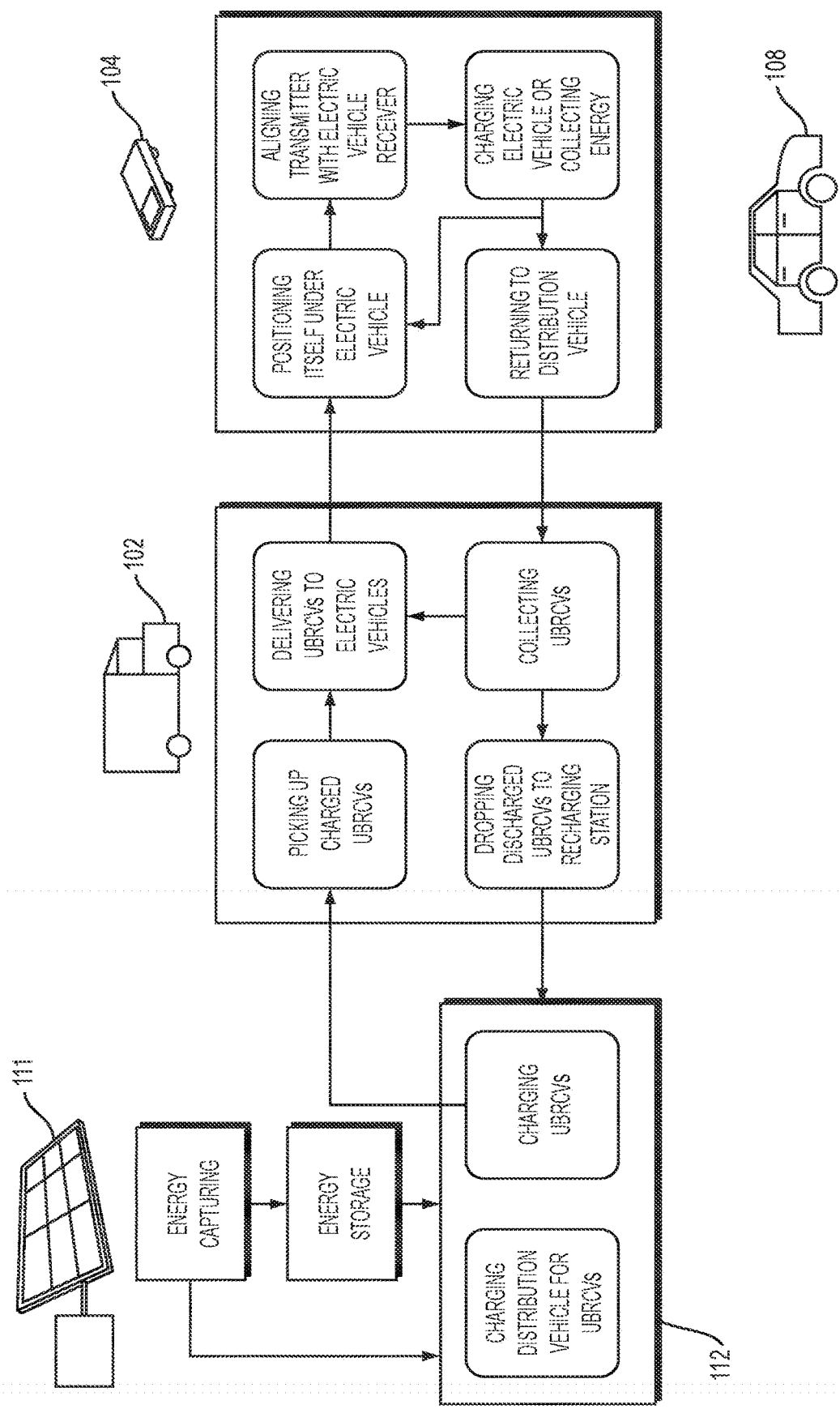
FIG. 2 is an illustration of certain aspects of an example system for the physical process of renewable energy delivery according to certain aspects of the present disclosure.

FIG. 2 is an illustration of the physical process of a renewable energy delivery. Although FIG. 2 shows a single distribution vehicle for UBRCVs 102, a UBRCV 104, power generation and storage station 111, charging station 112, and an EV 108, in some cases the delivery process may include more than one of these mentioned devices. In some examples, the process does not have a clear beginning due to multiple variables and options. One skilled in the art will be able to discern the various alternatives and circumstances with which may affect or require a change in the process. In some examples, the process may begin at the power generation and storage station 111. The energy capturing technique may vary depending on the energy source. A non-limiting example could be solar panels for solar energy, wind turbines for wind energy, turbines for hydropower, etc. Often such stations are located outside of cities in rural areas. Captured energy may be supplied to the grid, but it is complex to assure that energy received by the user is renewable energy. In some cases, captured energy may be directly transferred to the distribution vehicle for UBRCVs 102, or the UBRCV 104. In other examples, the captured renewable energy is stored in energy storage devices. The distribution vehicle for UBRCVs 102, or the UBRCV 104 are then charged from it. The energy transfers from the renewable energy storage to the distribution vehicle for UBRCVs 102, or the UBRCV 104 is done at the charging station. In some examples, charging stations may use wired or wireless energy transfer techniques. In some examples, charging of the distribution vehicle for UBRCVs 102 or the UBRCV 104 is done independently, and do not have to be done simultaneously. In some examples, when the charging of the distribution vehicle for UBRCVs 102 is complete, the charged UBRCVs 104 is loaded into the distribution vehicle for UBRCVs 102. In some examples, the next task is delivering the UBRCVs 104 to one or more EVs 108. For example, when the distribution vehicle for UBRCVs 102 is in close proximity to the EV 108 that requested charging, the UBRCVs 104 is deployed. The UBRCVs 104 then position with respect to the EV 108 (e.g., under the EV 108) to allow the energy transfer after making any needed adjustments to its position in order to align the transmitter with the EV 108 receiver. In some examples, alignment of energy transmission devices may improve the efficiency of the energy transfer. However, in some examples, the charging may begin even if efficiency is not immediately achieved, as optimization of the alignment may be done while charging. In the event of a poor efficiency or system failure, a wired backup system may be used. In some non-limiting examples, such as parking lots, warehouses, airfields, and harbors, the UBRCV 104 can be charged at a charging station and can be used to charge EV 108 without a necessity of using the distribution vehicle for UBRCVs 102. In some examples, the UBRCV 104 can operate in one or more manually controlled, remotely controlled, semiautonomous, or autonomous modes to reach the EV 108. The UBRCVs 104 can then position itself with respect to the EV 108 (e.g., under the EV 108) to allow the energy transfer after making any needed adjustments to its position to align the transmitter with the EV 108 receiver.

In some aspects, an alternative to charging the EV 108 is to receive the excess energy from the EV 108 and transfer it to the UBRCVs 104. In these examples, after charging or receiving energy from the EV 108 is complete, the UBRCVs 104 may perform at least two different actions. First, it may return to the distribution vehicle for UBRCVs 102 and, second, it may position itself under another EV requesting a recharge and/or transfer of energy. The decision of which option to choose may be made by a predefined program, algorithm, or the operator. When the UBRCVs 104 do not have enough charge to fulfill upcoming requests, it is collected by the distribution vehicle for UBRCVs 102. In some examples, the UBRCV 104 is also collected by the distribution vehicle for UBRCVs 102 when the distance to travel to fulfill the next charging request is too far. After the distribution vehicle for UBRCVs 102 is filled with the discharged UBRCVs 104, or depending on the upcoming charging request, the UBRCVs 104 may, for example, return to the charging station 112. Depending on the upcoming charging request, the distribution vehicle for UBRCVs 102 may collect other charged UBRCVs 104 from the charging station 112 or if needed the distribution vehicle for UBRCVs 102 may be recharged. All the tasks and processes may be completed manually, autonomously or semiautonomous depending on the equipment capability, time constraints and complexity, etc.

Figure 3:
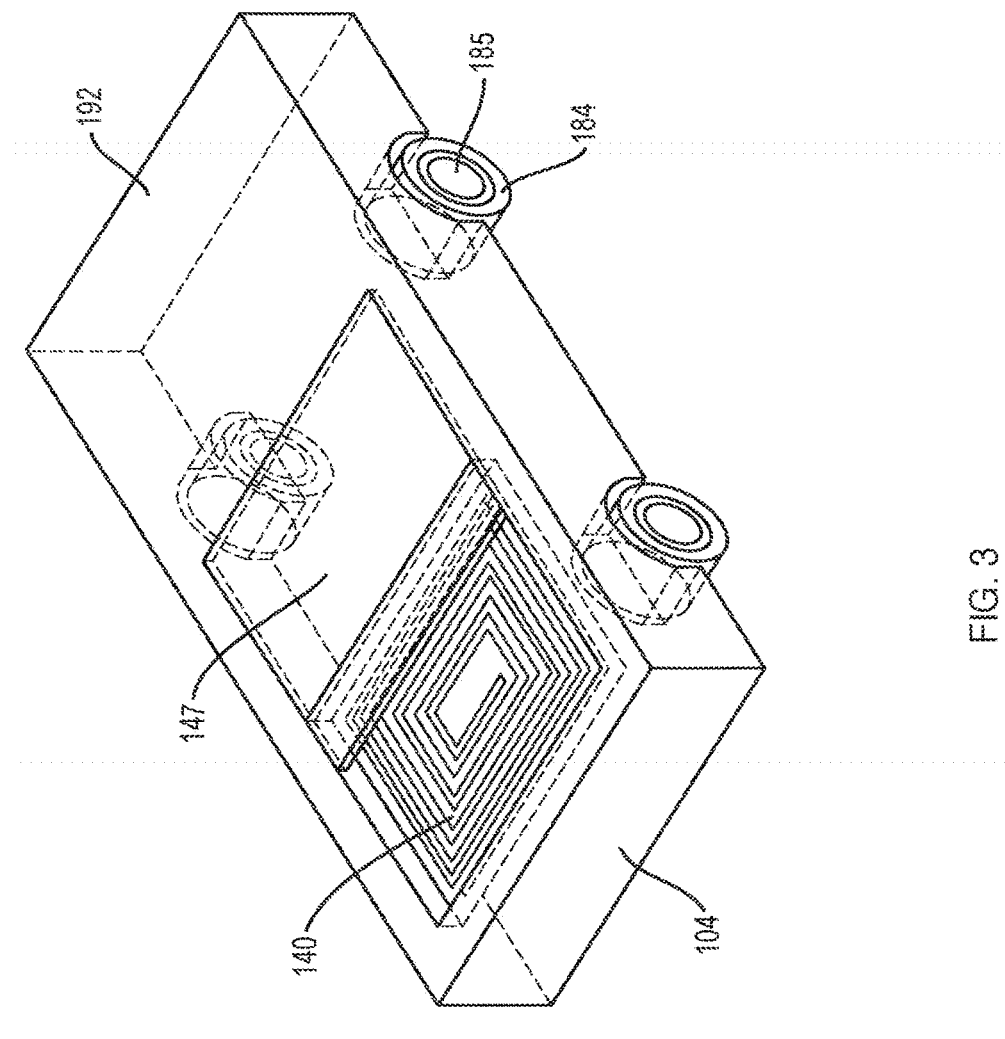
FIG. 3 is an illustration of certain aspects of an example UBRCV and selected modules.

FIG. 3 is an illustration of UBRCV and selected modules. In some examples, the general dimensions of the UBRCV 104 depend on the EV wheelbase, track and ground clearance. For example, in order to fit under the EV the UBRCV 104 may need to be not wider than about 1550 mm (X-axis), not longer than about 2500 mm (Z-axis), and not higher than about 180 mm (Z-axis). A person skilled in the art will recognize that other dimensions are possible, including dimensions larger and smaller than those listed above, without departing from the spirit of the present disclosure. More generally, a person skilled in the art, in view of the present disclosures, will understand the dimensions of the UBRCV can depend, at least in part, on the type and dimensions of the EV with which the UBRCV is being used and/or the vehicle being used to transport the UBRCV (if any) to a location where the EV will be charged, among other factors. In some examples, the UBRCV may be configured to transfer or receive energy using the resonance wireless charging transmitter 140 or other energy-transmitting device. Transmitter 140 may be a part of the energy-transmitting module. Individual transmitting device or the whole module may be protected by the cover 147 and the casing 192.

In some examples, the cover 147 may be constructed of a single material or combination of materials such as for non-limiting example, aluminum, plastic etc. In some examples, the cover 147 may be a single piece or assembly of few pieces, which allows folding, rolling, bending etc. In some examples, a purpose may be protection from direct impact of foreign objects, weather conditions, and allow easy access to energy transmitting module etc. In some examples, the cover may be closed most of the time and opened, only in special situation such as maintenance, need for increased energy efficiency etc. For example, the energy-transmitting module may include one or more moveable guiding components that are used to increase the efficiency of the energy transmission between the UBRCVs 104 and the EV 108. The energy-transmitting module may control these moveable guiding components allowing precise alignment of the transmitter and the receiver. The cover 147 may open and the guiding components may move the transmitter 140 for the optimized alignment.

In some examples, the casing 192 may be constructed of a single or combination of materials such as for non-limiting example, aluminum, plastic etc. The casing 192 may be a single piece or assembly of few pieces.

In some examples, casing 192 may be a part of UBRCV frame, which, in some instances, may have a structural unibody construction frame such that the UBRCV frame, body and casing 192 are integrated. In another non-limiting example, the UBRCV frame may have a body-on-frame such that the UBRCV frame is separate from its body and casing 192. In some examples, the UBRCV frame may also be a monocoque structure, such that there is no separate casing 192.

Certain aspects of the UBRCV 104 may have one or more various types of electric motors. It may also have at least one electric motor 185 built into at least one wheel 184. An electric motor 185 that may be incorporated into the hub of a wheel 184 and drives the wheel directly. Such solution may be called: "wheel hub motor," "wheel motor," "wheel hub drive," "hub motor," "in-wheel motor," etc. Main benefit for UBRCV 104 of this solution may be more space for energy storage module and other components as well as simplified mechanics, etc.

Certain aspects of the UBRCV may include wheels 184, which can allow the UBRCV 104 to move in any direction. In some examples, this is enabled by giving different commands to different motors, turning all the wheels, or, by way of non-limiting example, by using, "Omni wheels," "poly wheels," "Mecanum wheels," "Ilon wheels," etc. This type of wheels may move in any direction and turn by varying the speed and direction of each wheel. Moving all four wheels in the same direction may causes forward or backward movement. Running front and rear wheels in opposite directions may cause sideways movement of the UBRCV 104. Running left or right sides in opposite directions may causes rotation of the UBRCV 104. The wheels may be mounted in a way, so that the suspension ensures that all wheels can adhere to the ground, even when the ground is uneven. In yet another example continuous track, also called "tank tread" or "caterpillar track," may be used. In some examples, the UBRCV 104 can include a propulsion system in which a continuous band of treads or track plates may be driven by two or more wheels. In some examples, this band may be made of modular plates, synthetic rubber, reinforced synthetic rubber with wires etc.

Figure 4:
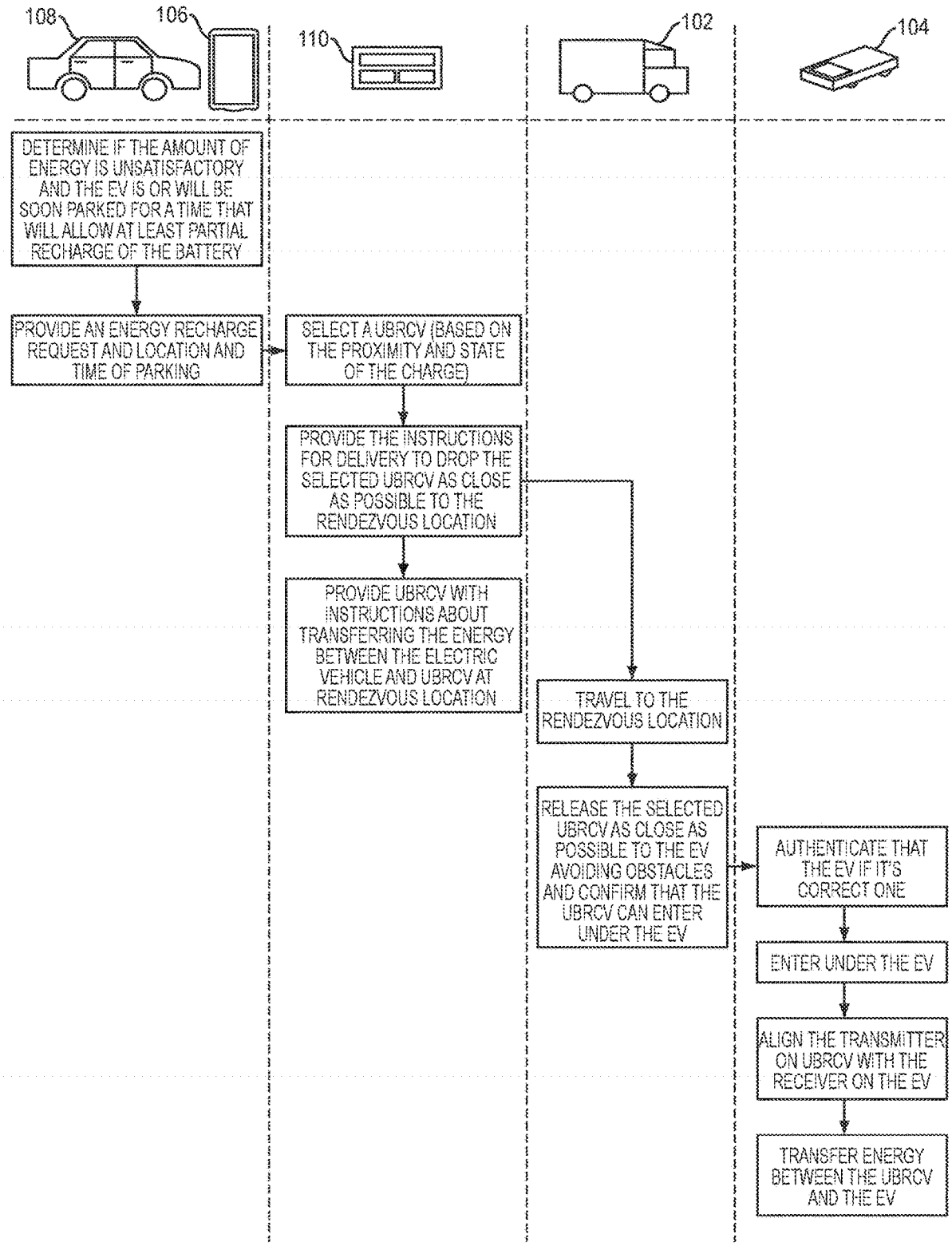
FIG. 4 is a flow diagram illustrating example processes and methods for transmitting energy between an EV and the UBRCV.

FIG. 4 is a flow diagram illustrating the processes and methods of energy transmission between an EV and the UBRCV. More particularly, it shows a process and describes methods of energy transmission during which an EV 108 may be recharged or may deploy energy using specialized apparatuses. This is a base process, which may be modified and adapted depending on the individual circumstances.

In some examples, the processes for recharging an EV 108 may be initiated by a cellphone and installed application or other remote device 106, a website interface on the internet etc. or from the vehicle level on a display, or automatically by EV 108 if specialized software is installed. The initial step may be to determine the amount of energy stored in the energy storage device. If the amount of energy stored in the energy storage device is unsatisfactory and the EV 108 is or will be soon parked for a time that may allow at least partial recharge of the battery, then the request for the recharge may be made. In some examples, when the recharge request is made, different types of data may be sent to the server 110 such as, for a non-limiting example: location of parking, time of parking, current state of charge, vehicle type, previous and future charging requests, EV sensor information, etc. In some examples, the server 110 or the operator may then select a UBRCV 104 to fulfill the request. In some examples, the selection process may be done based on the proximity of UBRCV 104, the state of the charge of UBRCV 104, proximity and state of charge of the distribution vehicle for UBRCV 102, etc. In some examples, the server 110 or the operator may also provide instructions for the distribution vehicle for UBRCV 102 to drop the selected UBRCV 104 as close as possible to the rendezvous location with the EV 108. In some examples, such instructions may include the route selection, data from location modules, data storage modules, detection and position modules, among others. In some examples, one possible goal is to get the distribution vehicle for UBRCV 102 quickly to the desired location as well as to position it in a way to allow deployment of the UBRCV 104. In some examples, after receiving the necessary data and instructions, the distribution vehicle for UBRCV 102 may travel to the parking location of the EV 108. In some examples, the server 110 may also independently, or in the same data package, provide the UBRCV 104 with instructions about transferring the energy to re-charge the EV 108 at a rendezvous location. In some cases, the UBRCV 104 may not need the distribution vehicle for UBRCV 102 to fulfill the charging request. For a non-limiting example, the UBRCV energy storage may have enough charge to fulfill more than one charging request and if the distance between the first requested location and the second is not far, then the UBRCV 104, after finishing the first request, may travel by itself to a second location. The distribution vehicle for UBRCV 102 may release the selected UBRCV 104 as close as possible to the EV 108 avoiding obstacles and assuring that the UBRCV 104 can enter under the EV 108.

In some examples, to confirm that the correct EV 108 will be charged, one or more authentication techniques can be used before the charging begins. For a non-limiting example, the UBRCV 104 may execute a first authentication based on information acquired from an onboard optical sensor such as, for example, a camera. Authentication may be done by, for example, a comparison of the information received from an optical sensor with the information stored in the database on the server 110 or received with the charging request. In some examples, if the operator of the distribution vehicle for UBRCV 102 is present, the operator may verify the license plate and description of the vehicle against the information sent during the charging request. In some examples, the authentication processes may be used to protect the UBRCV 104 from connecting with devices controlled by malicious users. In some examples, the user's EV 108 may also be protected from connecting with devices pretending to be UBRCV 104 trying to acquire data or energy from the EV 108.

In a manual mode example the operator can place and align the UBRCV 104 at the desired location under the EV 108 and initiates the electricity transfer with physical contact between the operator and the UBRCV 104. In a remotely controlled mode example, the UBRCV operator can remotely move and align the UBRCV 104 at the desired location, and remotely initiate the electricity transfer without physical contact. In a semi-autonomous mode example, the UBRCV 104 may perform route selection, route navigation, route piloting, alignment of the UBRCV 104 at the desired location, initiate the electricity transfer, request recharging and so forth by itself, however, the UBRCV 104 may also require some human intervention. In a fully autonomous mode example, the UBRCV 104 may be configured to manage the various operations and processes (e.g., route selection, route navigation, route piloting, and alignment of the UBRCV 104 at the desired location, initiate the electricity transfer, request recharging, and so forth) without human intervention.

In some examples, once the UBRCV 104 is under the EV 108, it may find and identify if a pattern such as barcode, marker, or QR-code match the one in the database. In some examples, other types of identification may also be used to guide the UBRCV for correct alignment of the transmitter with the EV receiver, such as for example beacons, Bluetooth sensors, RFIDs, BLE, NFC, or others.

Once the UBRCV transmitter is aligned with the EV receiver, a transfer of the energy between the UBRCV 104 and the EV 108 can take place. In some examples, the energy transfer may be done from UBRCV 104 to the EV 108 or reversed depending on the charging request. In the event that wireless transmission is not possible, a wired backup system may be used.

In some examples, a confirmation processes may also be used to confirm whether energy is being transferred between the UBRCV 104 and the EV 108. The amount of energy that is able to be transferred between the UBRCV and the vehicle and other data may be exchanged between the devices in the system. Based on this information different analysis responses may be made. For a non-limiting example, data analysis may estimate how much energy may be transferred during the predetermined charging request and the percentage of total EV battery capacity that will be recharged.

Termination of the energy transfer process may occur in multiple ways. In one example, the determined charging time has passed and there were no new requests for energy transfer. In other examples, other possibilities include but are not limited to situations in which the EV 108 leaves before the defined time, the battery of the EV 108 is full, requested amount of was energy transferred, there is no possibility to receive more energy due to issues at EV 108 or UBRCV 104, or the UBRCV 104 energy storage has insufficient energy to continue, etc.

Figure 5:
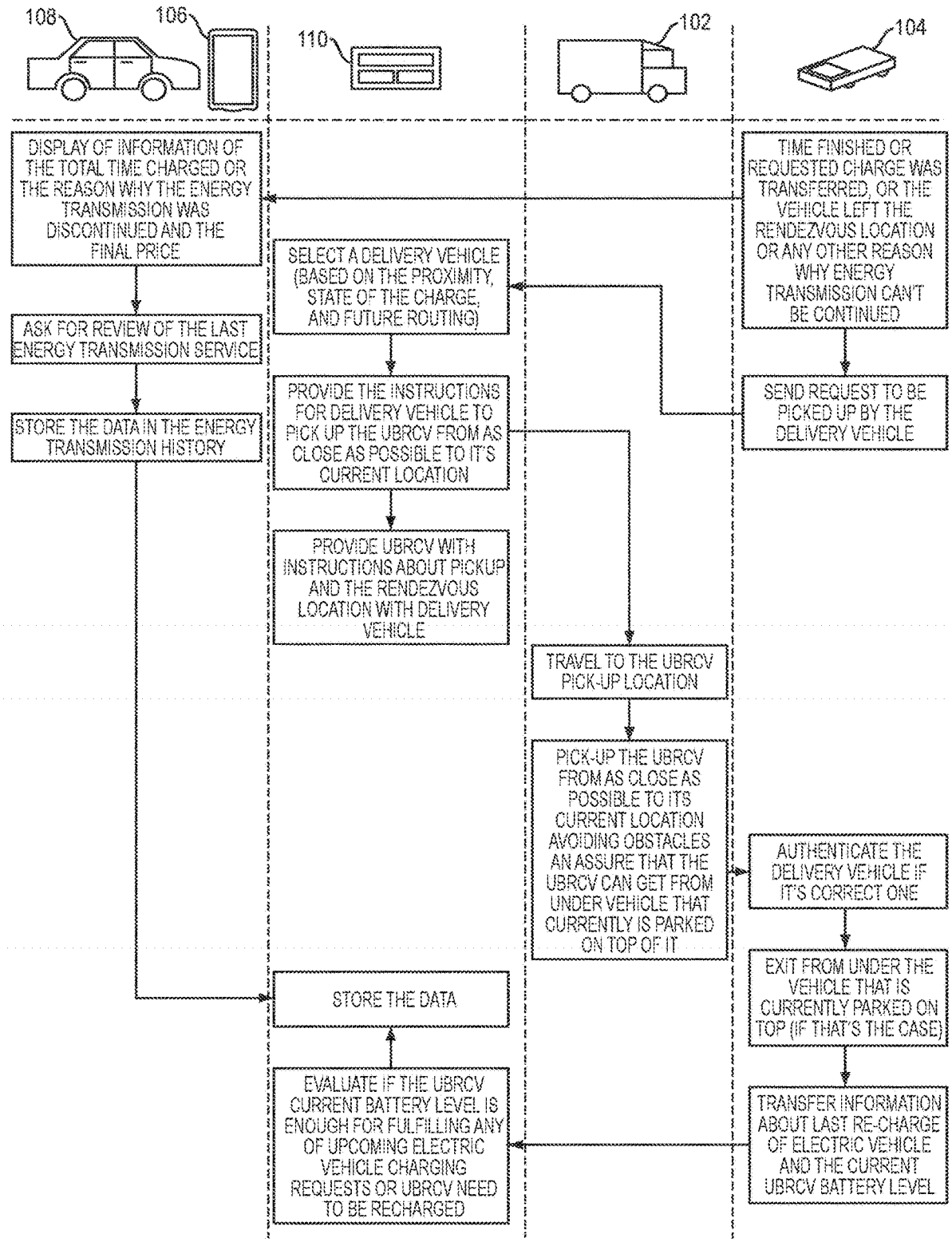
FIG. 5 is a flow diagram illustrating example processes occurring after an energy transmission between the UBRCV and the EV is finished.

FIG. 5 is a flow diagram illustrating an example process occurring after energy transmission between UBRCV and the EV is finished. The energy transfer process may finish in multiple ways. The information about the total time charged, the reason why the energy transmission was discontinued, the final price etc. may be displayed to the user equipment 106, 108 or stored in the server 110. A variety of different user interfaces may be used such as, for a non-limiting example, an app on the user's cellphone 106 or the EV 108. User may also be asked to review the last energy transmission service and leave additional comments. The data may be then stored in the energy transmission history on the user's device 106 as well as on the server 110.

In some examples, there is an option for the UBRCV 104 to be used by the system to fulfill the other charging request (not show on the figure). In some examples, the UBRCV 104 may not need the distribution vehicle for UBRCV 102 to be picked up. For a non-limiting example, the UBRCV energy storage may have enough charge to fulfill more than one charging request and the distance between the first requested location and the second is not too far, then the UBRCV 104 after finishing the first request may travel by itself to a second location. In some cases, the distance to travel may be too far or the energy storage device in the UBRCV 104 may need to be recharged, etc. Then, for example, the distribution vehicle for UBRCV 102 may be requested to travel to the current location of the UBRCV 104 to be picked up. In some examples, selection of a distribution vehicle for UBRCV 102 may be done by the server 110 or the operator. In some examples, the UBRCV 104 may not necessarily be picked up by the same the distribution vehicle for UBRCV 102 that dropped it off. Selection of a distribution vehicle for UBRCV 102 may be based on, for example, the proximity, state of the charge, and future routing, among other variables. The selected distribution vehicle for UBRCV 102 may be provided with the instructions to pick up the UBRCV 104 from as close as possible to the current location of the UBRCV 104. In some examples, the server 110 may also provide the UBRCV 104 with instructions about pickup, the rendezvous location and any changes that may happen. Such information may be alternatively provided by the distribution vehicle for UBRCV 102 or the operator. In some examples, the distribution vehicle for UBRCV 102 may travel to the determined UBRCV pick-up location. The distribution vehicle for UBRCV 102 may pick-up the UBRCV 104 from as close as possible to the current location of the UBRCV 104, avoiding obstacles and assuring that the UBRCV 104 can get out from under the vehicle currently parked over it. Alternatively, in manual mode the operator may need to remove the UBRCV 104 from under the EV 108. In a remotely controlled mode example, the UBRCV operator can remotely remove the UBRCV 104 from under the EV 108, without physical contact. In a semi-autonomous mode example, the UBRCV 104 may perform route selection, route navigation, route piloting, moving etc., however, the UBRCV 104 may also require some human intervention. In a fully autonomous mode example, the UBRCV 104 may be configured to manage one or more of the various operations and processes (e.g., route selection, route navigation, route piloting, moving and so forth) without human intervention. In order to confirm that the correct distribution vehicle for UBRCV 102 will pick up the UBRCV 104, a multiple authentication technique may be used before the pickup occurs. For example, the UBRCV 104 may execute a first authentication based on information acquired from an onboard optical sensor such as, for example, a camera. Authentication may be done by comparison of the information received from an optical sensor with the information stored internally or in the database on the server. Authentication processes may be used to protect the UBRCV 104 from being stolen by malicious users. In the event that the authentication fails but the UBRCV 104 is being moved or some other activity is detected, then the UBRCV 104 may send an alert to the server 110, operator or distribution vehicle for UBRCV 102. Communication between the UBRCV 104 and the server may occur frequently to inform about the current status of UBRCV 104. In some examples, additional information may be shared during key steps and while finishing certain parts of the process such as, in a non-limiting example, the last energy transfer, pickup, etc. In some examples, based on such information, the server 110 may evaluate the UBRCV 104 current energy storage status to decide what should be done to the UBRCV 104.

In some examples, transaction information, tracking objects in the system as well as other processes previously mentioned to involve server 110 may be decentralized with usage of blockchain technology. Blockchain may provide the means for tracking the movement of a distribution vehicle for UBRCVs 102, an UBRCV 104, cell phone with application or other remote device 106, an EV 108, as well as recording transactions, and other intangible or digital information. Blockchain is not a replacement for server 110, databases, transactions, processes etc. Instead, the blockchain contains, but is not limited to verified proof of transactions and other information. The blockchain architecture may provide the ability to share a ledger that is updated through peer-to-peer replication each time a process occurs. Peer-to-peer replication may mean that each node (object in the system) in the network acts as both a publisher and a subscriber of information. In some examples, blockchain's security features may protect against tampering, fraud, and cybercrime. In some examples, the network may be a members-only network with proof that members are legitimate and that time and amount of energy transferred are exactly as represented. In some examples, energy transfer settlement may be faster because it does not require verification. In some examples, there may be less oversight needed because the network is self-controlled by network participants, all of whom are known on the network.

Figure 6:
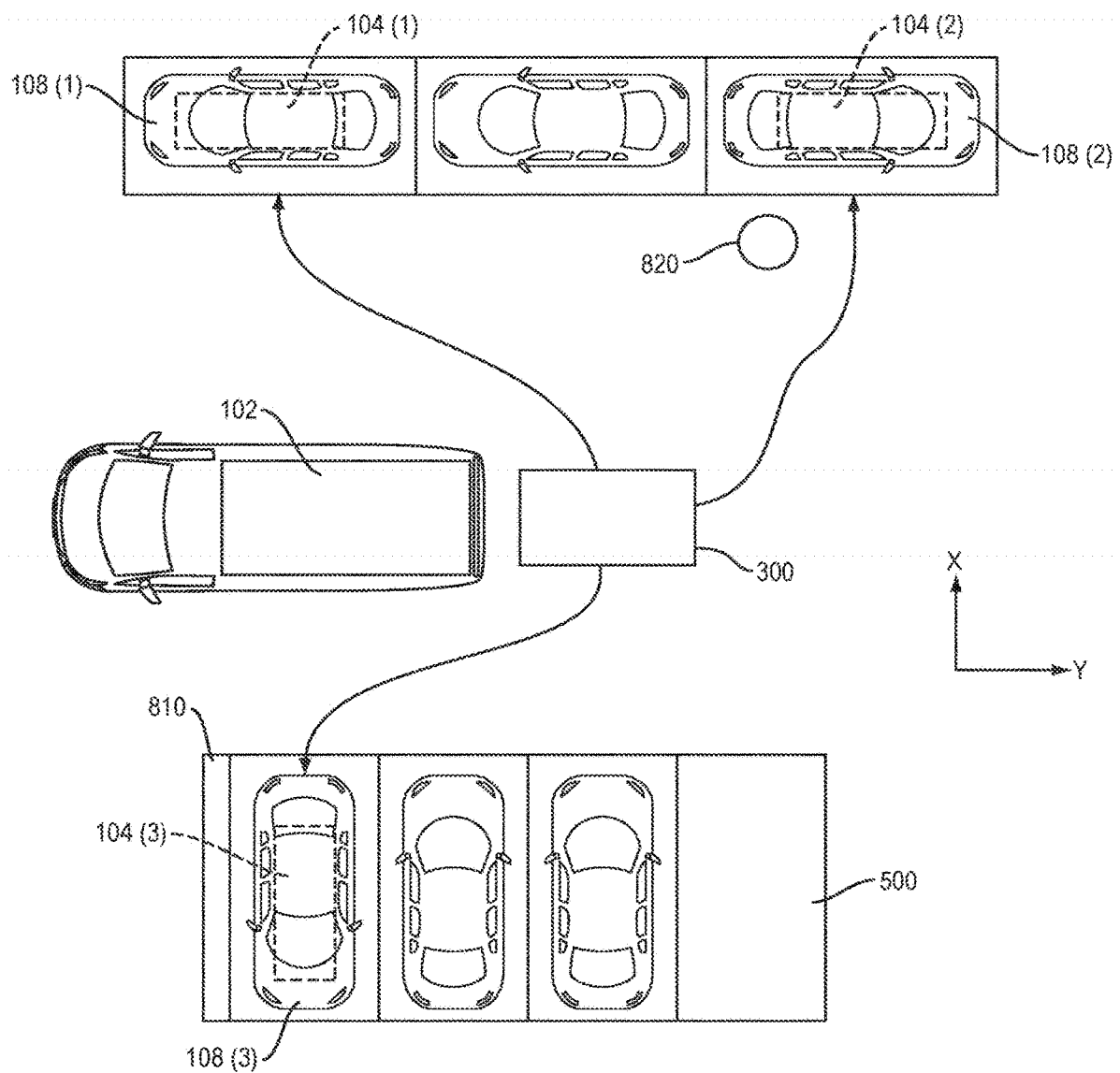
FIG. 6 is an illustration of an example UBRCV deployment operation using a distribution vehicle for the UBRCV and subsequent processes.

FIG. 6 is an illustration of a UBRCV deployment operation using the distribution vehicle for UBRCV and following processes. In some examples, execution of the charging request and alignment of the UBRCV transmitter and the EV receiver may be done in a variety of locations. Examples of suitable locations are individual parking spots 500, public and private parking areas, parking lots at locations such as shopping centers and places of employment or roadside stops, etc. After the distribution vehicle for UBRCV 102 arrives in near proximity of the EV 108 that requested the charge, the distribution vehicle for UBRCV 102 may be parked in a location, which allows for the safe and as easy as possible deployment of the UBRCV 102. In at least some embodiments, the UBRCVs 104 may be unloaded from the distribution vehicle for UBRCV 102 and placed in an initial position 300. FIG. 6 illustrates a non-limiting example in which two UBRCVs 104 (1 and 3) may be used for energy transmission from the UBRCVs 104 to the EVs 108 (1 and 3), and illustrates the transfer of renewable source energy from an EV 108 (2) to the UBRCV 104 (2). In some examples, which UBRCV 104 to use to fulfill a particular charging request may be decided by the server or by the operator. In a manual mode example, the operator may place and align the UBRCV 104 at a desired location and initiate the electricity transfer. In a remotely controlled mode example, the UBRCV 104 operator may place and align the UBRCV at the desired location and initiate the electricity transfer without physical contact. In a semi-autonomous mode example, the UBRCV 104 may perform one or more of the following operations by itself: route selection, route navigation, route piloting, aligning the UBRCV 104 at the desired location, initiation of the electricity transfer, and so forth, however, the UBRCV 104 may also require some human intervention. In a fully autonomous mode example, the UBRCV 104 may be configured to manage the various operations and processes (e.g., route selection, route navigation, route piloting, align the UBRCV 104 at the desired location, initiate the electricity transfer and so forth) without human intervention. In some examples, regardless of the level of autonomy, the UBRCV 104 may need to move under the EV 108.

In a non-limiting example, the UBRCV 104 (1) is moving under the EV 108 (1) by entering at the side of the EV 108 (1). Slightly before entering under the EV 108 (1), the UBRCV 104 (1) may be in a nearly parallel position. This means that the Y-axis of 108 (1) and the Y-axis of the UBRCV 104 (1) may be in nearly parallel position and the movement of the UBRCV 104 (1) to go under the EV 108 (1) may be done along the X-axis of the EV 108 (1). In another non-limiting example, the UBRCV 104 (2) is moving under the EV 108 (2) by entering at the side of the EV 108 (2). Slightly before entering under the EV 108 (2), the UBRCV 104 (2) may be in a nearly perpendicular position. This means that the Y-axis of EV 108 (2) and the Y-axis of the UBRCV 104 (2) may be in nearly perpendicular positions and the movement of UBRCV 104 (2) to go under the EV 108 (2) maybe be done along the X-axis of the EV 108 (2). In another non-limiting example, the UBRCV 104 (3) is moving under the EV 108 (3) by entering at the rear of the EV 108 (3). Slightly before entering under the EV 108 (3), the UBRCV 104 (3) may be in a nearly aligned position, which means that the Y-axis of EV 108 (3) and the Y-axis of the UBRCV 104 (3) may be in nearly an aligned position and the movement of UBRCV 104 (3) to go under the EV 108 (3) maybe be done along the Y-axis of the EV 108 (2). Determining factors for the path selection include, without limitation, are the size of the UBRCV 104, the EV 108 wheelbase (the distance between the centers of the front and rear wheels), the EV 108 track (the distance between the centerline of two road wheels on the same axle), surrounding obstacles, as well as other vehicles parked nearby. In the example shown on FIG. 6 the EV 108 (1) and EV 108 (2) were not accessible from the back due to another parked car. Additionally, the UBRCV 104 (2) path had to be adjusted due to an obstacle 820 in front of the EV 108 (2). The EV 108 (3) was not accessible from the side due to the car parked nearby as well as the obstacle 810. After the vehicles are in the desired position and the energy transfer may begin, the distribution vehicle for UBRCV 102 may leave the site. The distribution vehicle for UBRCV 102 may receive instructions from the server or the operator. Depending on the instructions given, the distribution vehicle for UBRCV 102 may travel to the recharging station, may pick up or deploy other UBRCVs 104, or park in a secure location, etc.

Figure 7:
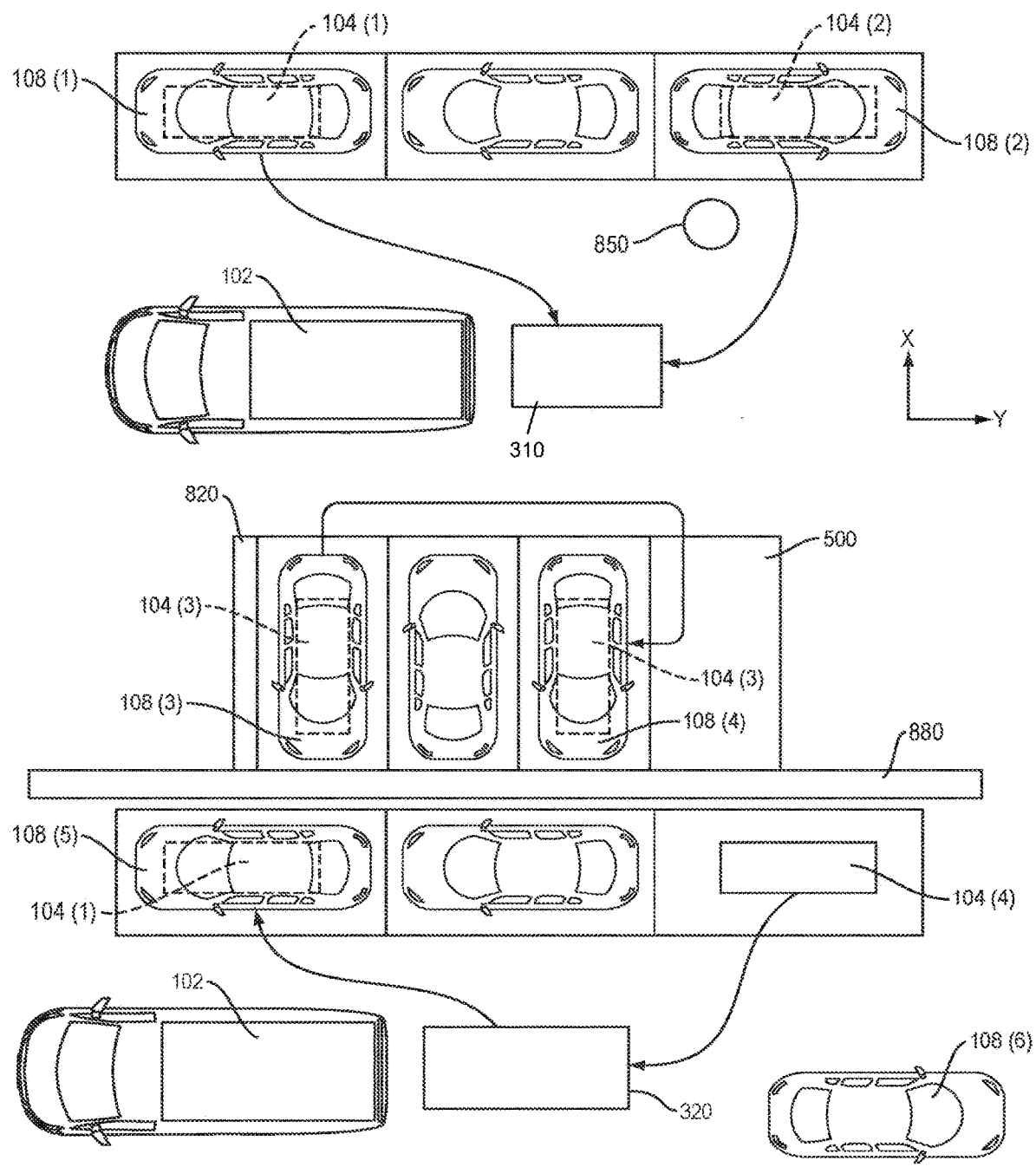
FIG. 7 is an illustration of example UBRCV collection, deployment, and redistribution operations.

FIG. 7 is an illustration of UBRCV collection, deployment, and redistribution operation using the distribution vehicle for UBRCV and done independently. At some point, the energy transfer between the UBRCV 104 and the EV 108 is terminated. Termination of the energy transfer process may be accomplished in multiple ways. A non-limiting example may be that the determined time has elapsed or the agreed charge level was reached. Other possibilities include but are not limited to situations in which the EV 108 left before the defined time, the battery of the EV 108 is full, there is no possibility to receive more energy due to issues with the EV 108, the UBRCV 104 energy storage has insufficient energy to continue, etc. The UBRCV 104, server (not visible on the figure) or operator may send a distribution vehicle for UBRCV 102 for the collection of UBRCVs. Additionally, the UBRCV 104 may be requested to perform some tasks independently from the distribution vehicle for UBRCV 102. After the distribution vehicle for UBRCV 102 arrives in near proximity to the UBRCV 104 that requested pickup, the distribution vehicle for UBRCV 102 may be parked in a location that allows safe and as easy as possible loading of the UBRCV 104 onto the distribution vehicle for UBRCV 102. FIG. 7 illustrates a non-limiting example in which three UBRCVs 104 (1, 3 and 4) just finished the request for energy transmission from UBRCVs 104 to the EVs 108 (1, 3 and 6), and one UBRCV (2) which just finished the request for energy transmission from an EV 108 (2) to the UBRCV 104 (2). The latter occurs when the EV 108 (2) sells renewable source electricity possibly for credit against future energy purchases or payment. In a manual mode example, the operator may need to remove the UBRCV 104 from under the EV 108 and place it into the distribution vehicle for UBRCV 102. In a remotely controlled mode example, the UBRCV operator may remove the UBRCV 104 from under the EV 108 and load it onto the distribution vehicle for UBRCV 102 without physical contact. In a semi-autonomous mode example, the UBRCV 104 may perform route selection, route navigation, route piloting, load itself onto the distribution vehicle for UBRCV 102 and so forth by itself, however, the UBRCV 104 may also require some human intervention. In a fully autonomous mode example, the UBRCV 104 may be configured to manage the various operations and processes (e.g., route selection, route navigation, route piloting, load itself onto the distribution vehicle for UBRCV 102 and so forth) without human intervention. Regardless of the level of autonomy, the UBRCV 104 may need to move from under the EV 108 and be loaded onto the distribution vehicle for UBRCV 102 or perform other task. In a non-limiting example, the UBRCV 104 (1) may move from under the EV 108 (1) and move onto the distribution vehicle for UBRCV 102. In another non-limiting example, the UBRCV 104 (2) may move from under the EV 108 (2) and move onto the distribution vehicle for UBRCV 102. In another non-limiting example, the UBRCV 104 (3) may move from under the EV 108 (3) to the EV 108 (4) by entering on the side of the EV 108 (4) via the empty parking space 500 beside EV 108 (4). Determining factors for path selection include, without limitation, the size of the UBRCV 104, as well as the EV 108 wheelbase (the distance between the centers of the front and rear wheels), the EV 108 track (the distance between the centerline of two road wheels on the same axle), surrounding obstacles 820, 850, 880, as well as other vehicles parked nearby. In the example shown on FIG. 7, EV 108 (1) and EV 108 (2) were blocked from the back due to another parked car, so the UBRCVs 104 (1 and 2) moved from the side. Additionally, the UBRCV 104 (2) path had to be adjusted due to an obstacle in front of the EV 108 (2). The EV 108 (3) was blocked from the side by the car parked nearby and the obstacle 820, that is why the UBRCV 104 (3) moved from the back of EV 108 (3). The path of UBRCV 104 (3) from under the EV 108 (3) to under the EV 108 (4) may be independent from the distribution vehicle for UBRCV 102 if, for example, the UBRCV 104 (3) has enough charge to fulfill the EV 108 (4) request and the distance to travel is not far. The EV 108 (6) may leave the parking space before the arrival of the distribution vehicle for UBRCV 102. In that case the UBRCV 104 (4) has a non-obstructed route to the distribution vehicle for UBRCV 102. It may also be possible that the UBRCV 104 (4) will drive under the UV 108 (6) and continue energy transfer. In order to do so the speed may be limited and the route, destination and other information of the UV 108 (6) may be known. Such special case needs to be agreed on and controlled. In at least some embodiments, as shown for example in FIG. 7, the UBRCVs 104 may return to or depart from an initial position 310, 320 (i.e., after being unloaded from the distribution vehicle for UBRCV 102 or prior to being re-loaded onto the distribution vehicle for UBRCV 102)

In certain aspects, at nearly the same time the distribution vehicle for UBRCV 102 is picking up the UBRCV 104 (4) the distribution vehicle may deploy the UBRCV 104 (1). The UBRCV 104 (1), after being picked up, was requested to fulfill the charging request of EV 108 (5). Since the path from its previous location to EV 108 (5) is obstructed by an obstacle 880 and the distance to travel is far, the distribution vehicle for UBRCVs 102 was used. After all requested tasks are performed, the distribution vehicle for UBRCV 102 may leave the site. The distribution vehicle for UBRCV 102 may receive instructions from the server (not visible on the FIG. 7) or an operator. It may be instructed to travel to the recharging station, pick up or deploy other UBRCVs 104, park in the secured location, etc.

Figure 8:
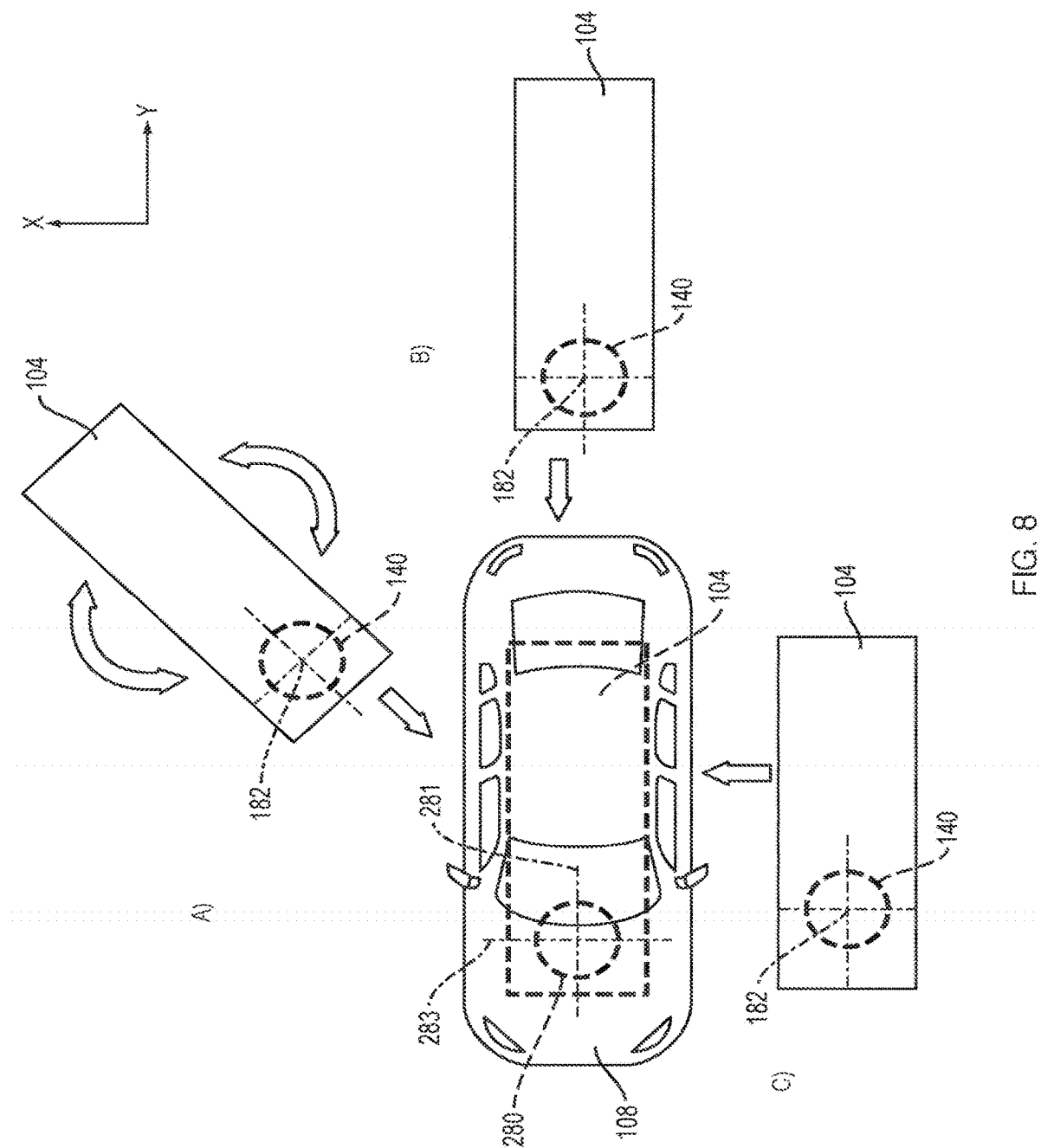
FIG. 8 is an illustration showing an example UBRCV positioning operation with an EV to assure correct alignment of a transmitter in the UBRCV with a receiver in the EV.

FIG. 8 shows a non-limiting example of a positioning operation for the UBRCV 104 to assure correct final alignment of UBRCV transmitter 140 with the receiver 280 in the EV 108. The UBRCV 104 may be used for energy transmission from UBRCVs 104 to the EV 108, or from an EV 108 to the UBRCV 104. In either case, efficiency is one consideration in a wireless power transfer system to minimize losses occurring in the course of wireless transmission of power. A wireless charging system for EVs may require transmitter 140 and receiver 280 to be aligned within a certain degree. Typically, the adequate alignment of transmitter 140 and receiver 280 within an EV wireless charging system requires complex and time-consuming positioning of the EV 108 within a parking space. In certain aspects of the present disclosure the EV 108 does not need to move and align as it is the UBRCV 104 that is positioning itself under the EV 108 and aligning the transmitter 140 with the receiver 280. There are many wireless energy transmission techniques such as: Inductive Charging, Electromagnetic Radiation, Resonance charging, Radio Frequency, Laser Wireless Charging, etc. Some of them allow near and far-field wireless energy transmission, but all of them need proper alignment to efficiently transfer energy.

In a manual mode example, the operator may place and align the UBRCV 104 at the desired location and initiate the electricity transfer. In a remotely controlled mode example, the UBRCV operator may place and align the UBRCV 104 at the desired location and initiate the electricity transfer without physical contact. In a semi-autonomous mode example, the UBRCV 104 may perform route selection, route navigation, route piloting, align the UBRCV 104 at the desired location and initiate the electricity transfer and so forth by itself, however the UBRCV 104 may also require some human intervention. In a fully autonomous mode example, the UBRCV 104 may be configured to manage the various operations and processes (e.g., route selection, route navigation, route piloting, and align the UBRCV at the desired location and initiate the electricity transfer so forth) without human intervention. Regardless of the level of autonomy, the UBRCV 104 may need to move under the EV. In non-limiting example (A) the UBRCV 104 moves under the EV 108 by entering on the side of the EV 108. Slightly before entering under the EV 108, the UBRCV 104 may be in an angular position to the EV 108. This means that the Y-axis of the EV 108 and the Y-axis of the UBRCV 104 may be not aligned. The UBRCV 104 may rotate itself along the Z-axis (perpendicular to X and Y, not visible on FIG. 8) as well as move in X and Y direction to fit under the EV 108.

In another non-limiting example (B), the UBRCV 104 moves under the EV 108 by entering on the rear side of the EV 108. Slightly before entering under the EV 108, the UBRCV 104 may be in a nearly aligned position. This means that the Y-axis of EV 108 and the Y-axis of the UBRCV 104 may be in a nearly aligned position and the movement of the UBRCV 104 to go under the EV 108 maybe be accomplished along the Y-axis of EV 108.

In non-limiting example (C) the UBRCV 104 moves under the EV 108 by entering on the side of the EV 108. Slightly before entering under the EV 108, the UBRCV 104 may be in a nearly parallel position. This means that the Y-axis of EV 108 and the Y-axis of the UBRCV 104 may be in nearly a parallel position and the movement of UBRCV 104 to go under the EV 108 maybe be done along the X-axis of EV 108.

In some examples, one determining factors of the path selection may be the size of the UBRCV 104, as well as the EV 108 wheelbase (the distance between the centers of the front and rear wheels), the EV 108 track (the distance between the centerline of two road wheels on the same axle), surrounding obstacles, as well as other vehicles parked nearby, etc. In some examples, after the UBRCV 104 is positioned under the EV 108, a fine tuning of the alignment between the transmitter axis 182 and receiver axis 283 may be performed in order to increase efficiency.

Figure 9:
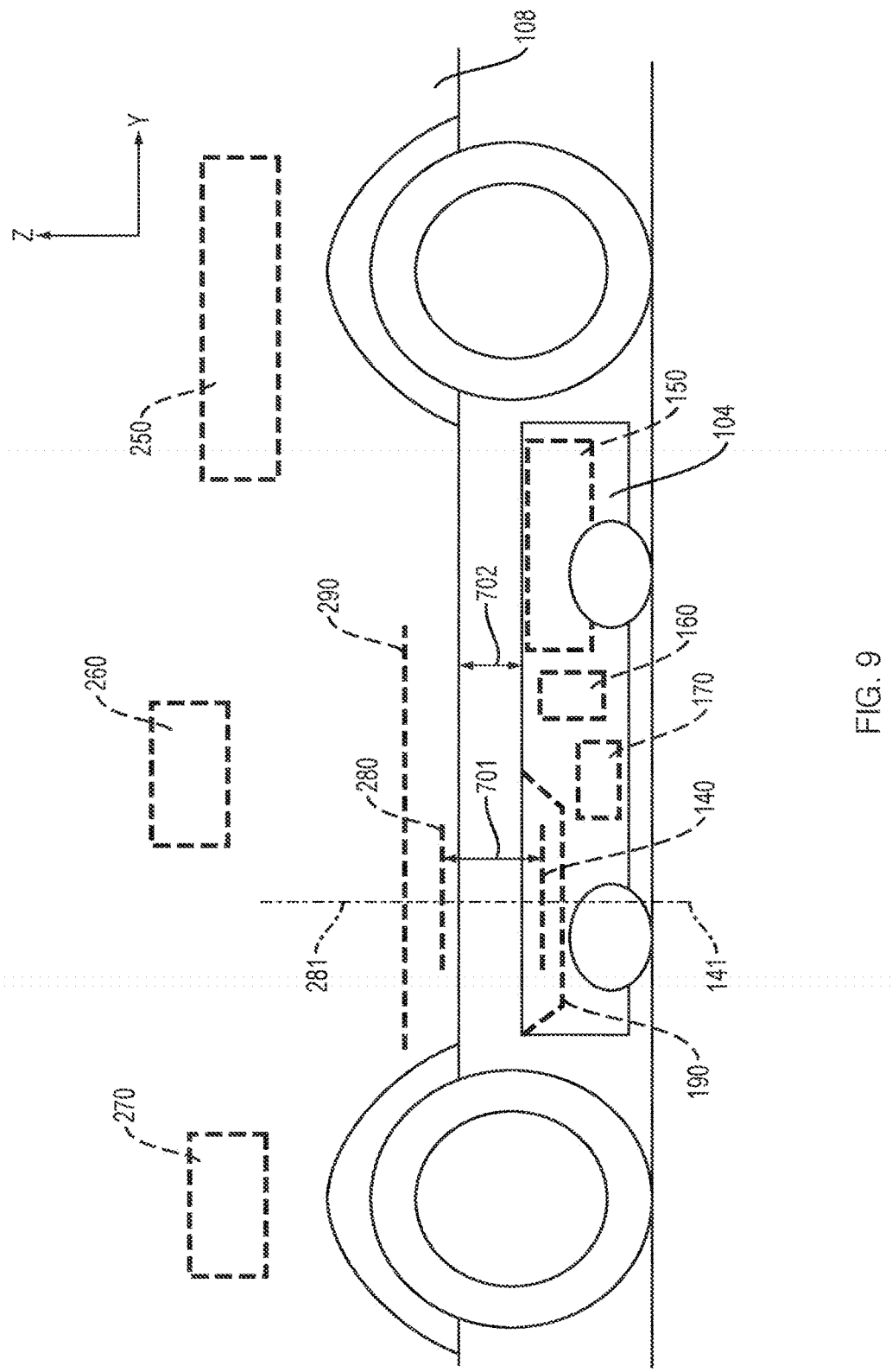
FIG. 9 is an illustration of an example alignment between a UBRCV transmitter and a receiver in an EV.

FIG. 9 is an illustration of an alignment between UBRCV transmitter 140 and a receiver in the EV 108. In some examples, the UBRCV 104 includes, among the other systems and modules, the energy storage device 150, a power conversion module 160, charging system 170, and energy-transmitting module for generating or picking up a near-field radiation. In some examples, the EV 108 includes an energy storage device 250, a power conversion module 260, charging system 270, and energy receiving module, along with other systems. An energy-receiving module interacts with the UBRCV energy-transmitting module picking up or generating near-field radiation. In some examples, the energy-transmitting module and energy receiving module may include various mechanical and electrical components such as one or more transmitters 140, receivers 280, controllers, valves, transistors, and so forth. In some examples, the energy-transmitting module may enable the UBRCVs 104 to transmit energy to the EV 108. In some examples, the energy-transmitting module may also enable the UBRCVs 104 to receive energy from the EV 108. Similarly, in some example, the energy-receiving module may also enable the EV 108 to transmit energy to the UBRCVs 104. In some examples, the energy-transmitting module in the UBRCVs 104 may be configured to operate with the energy-receiving module installed on the EV 108 to facilitate the transfer of the energy. For example, the energy-transmitting module may include one or more moveable guiding components that are used to increase the efficiency of the energy transmission between the UBRCVs 104 and the EV 108. In some examples, the energy-transmitting module may control these moveable guiding components allowing precise alignment of the transmitter 140 and the receiver 280.

When the UBRCV 104 is moving under the car there is a distance (702) that may need to be greater than 0 to allow movement of UBRCV 104 under the EV 108. In some examples, the UBRCV 104 fits under the EV 108 and the distance between transmitter and receiver (701) is correct for the energy transmission. In some examples, information about the EVs 108 is stored on the server and the appropriate UBRCV 104 is sent to assure the correct 701 and 702 distance to fulfill the charging request. It may happen that due to, for example, unevenness of the parking spot surface, overweight or unregistered modifications to the EV 108, etc. that there may be a need for a fine tuning of the distance 701. In some examples, after the UBRCV 104 is positioned under the EV 108 there may be fine-tuning of the alignment between the receiver Z-axis 281 and transmitter Z-axis 141. Such an alignment between energy transmitting modules and may be done in the initial stage as well as at any point of energy transfer to assure optimal efficiency of the energy transfer.

In some examples, the UBRCV power conversion modules 160 and 260 may include an oscillator, a power amplifier, and a filter. In some examples, the oscillator may be configured to generate a desired frequency, which may then be able to be adjusted. In some examples, the signal may be further amplified by the power amplifier. In some examples, the power conversion modules 160 and 260 also include a rectifier and a switching circuit to generate a suitable power output to charge the energy storage devices 150 and 250. In some examples, a UBRCV 104 may be configured to provide or to be charged with an Alternating Current (AC) or a Direct Current (DC) supply to power conversion systems, if needed. In some examples, the UBRCV 104 charging system may be used to charge the UBRCV 104 from an external source and as well as to provide a backup wired charging.

In certain aspects of the present disclosure, protection of the devices, modules and other system elements can be important. In some examples, apart from the structural protection of the chassis, covers, etc., there may also be a need for protection from the electromagnetic field. The EV 108 may already be equipped with an electromagnetic shield 290. If not, this component may be retrofitted. In some examples, the UBRCV 104 may be equipped with the electromagnetic shield 190 to reduce or eliminate the electromagnetic field by blocking the filed with barriers made of conductive or magnetic material. Materials such as sheet metal, wire mesh, metal screen, metallic ink, or metal foam among the others may be used for electromagnetic shields 190 and 290.

Figure 10:
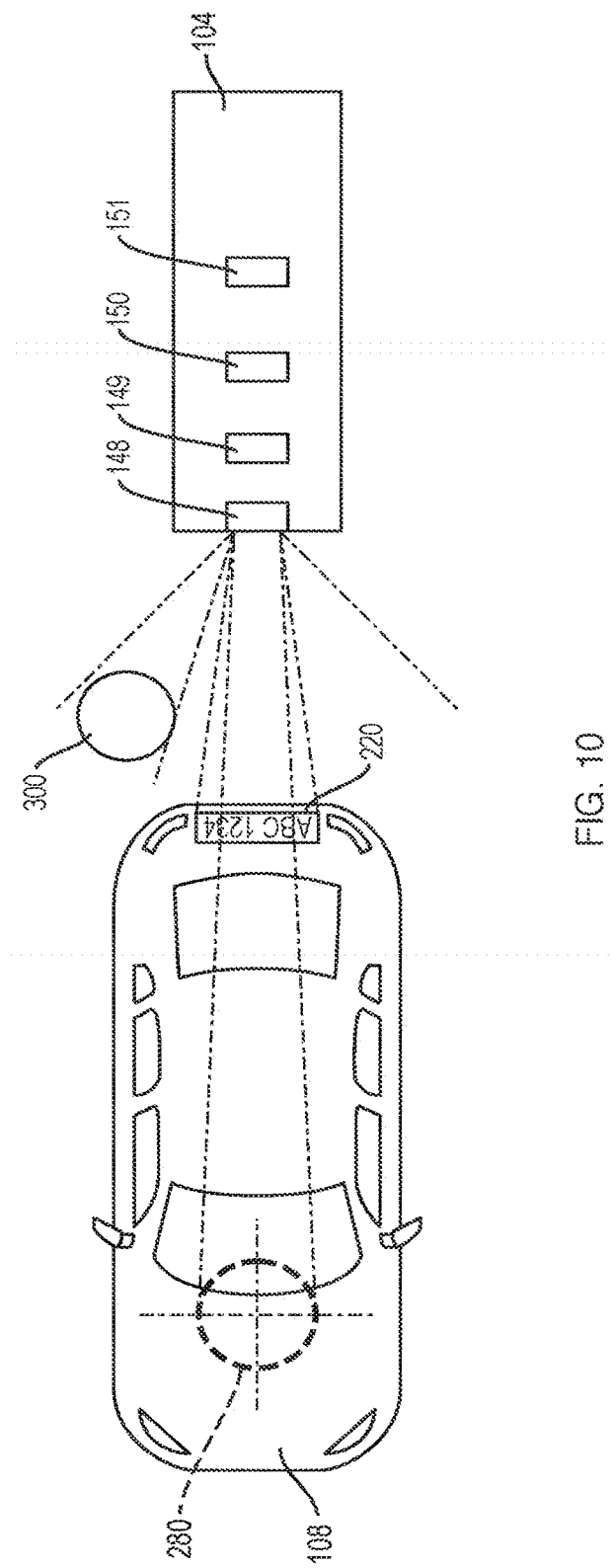
FIG. 10 is an illustration example obstacle and object detection, authentication, identification, and assisting processes.

FIG. 10 is an illustration showing obstacle and object detection, authentication, identification, and assisting processes. As a non-limiting example, the UBRCV transmitter and EV receiver 280 may need to be aligned within the near-field region. In some examples, this alignment may be accomplished by positioning the UBRCV 104 autonomously under the EV 108 and aligning the transmitter with receiver 280. The receiver 280 may be located in various locations in the vehicle, for example, in the underbody, chassis, battery pack, etc. which may make it not easy to find. In some examples, to find the correct vehicle, the UBRCV 104 may position itself under the EV 108 to find the receiver 280, using the detection and positioning module 148. In some examples, the detection and positioning module 148 may be composed of one or more inertial positioning sensors and surrounding recognition sensors such an acceleration sensor, gyroscope, motion sensors and rotation sensors. In some example, a detection and positioning module 148 may calculate the position of the UBRCV 104 based on integration of these sensors relative to one or more reference points, markers, etc. In some examples, the system may also determine the location of the UBRCV 104 by calculating the distance traveled from the EV 108 or the distribution vehicle by the UBRCVs.

In some examples, to confirm that the correct EV 108 will be charged, one or more authentication techniques may be utilized before the charging begins. For example, the UBRCV 104 may execute a first authentication based on information acquired from an onboard optical sensor such as, for example, a camera, which may be a part of the detection and positioning module 148. In some examples, the authentication module 149 may compare the information received from an optical sensor with the information stored in the database on the server (not visible on the FIG. 10). For a non-limiting-example, the license plate 220, type of vehicle, or color etc., may be checked. The operator of a distribution vehicle for UBRCVs may check the license plate and description of the vehicle and compare it with the information sent during the charging request, if present. In yet other examples, the UBRCVs control module 150 may receive inputs from and manage components and systems such as motors, optical sensors, acoustic sensors, acceleration sensors, gyroscopes, motion sensors and rotation sensors. Collisions avoidance, obstacle 810, 820, 850, 880 detection, path selection and routing are example functions of the control module 150. In some examples, the UBRCVs control module 150 may execute a program or series of programs to improve the safety of the UBRCVs 104 as well as the safety of its surroundings, especially living objects.

In some examples, the UBRCV 104 may use the on-board as well as the EV 108 sensor information for multiple actions such as, for example, to adjust the route to the parking location, align the receiver and the transmitter for optimal charging efficiency, confirm that the requested vehicle is at a determined parking location, and so forth.

In some examples, once the UBRCV 104 is under the EV 108 it may find and identify if a pattern such as a barcode, marker, or QR-code match the one from database. In some examples, other types of identification may also be used to guide the UBRCV 104 for correct alignment of the transmitter with the EV receiver, such as beacons, Bluetooth sensors, RFIDs, BLE, NFC, or others. Authentication processes are used to protect the UBRCV 104 from connecting with devices controlled by malicious users. In some examples, the user's EVs may also be equipped for protection against connecting with devices pretending to be a UBRCV 104 or other devices trying to acquire information and/or energy from the EV 108.

In other example, the UBRCV 104 may be positioned semi-autonomously to move the UBRCV 104 manually to avoid larger obstacles or to provide extra force to drive through an obstacle and then autonomously fine tune the alignment. In some examples, some or all of the necessary steps may be performed manually by the operator. Processes performed autonomously and semi autonomously by the UBRCV 104 can be performed via motors, various sensors, executable programs, and in some cases artificial intelligence. In some examples, the UBRCV 104 may maneuver the transmitter based on sensor information to more accurately align it and develop a more efficient near-field coupling.

In some examples, the UBRCV 104 may include a location module 151 configured to determine the current position of the UBRCV 104. The location module 151 may generate, for example, location data related to the location of the UBRCV 104. In some examples, the location data may include one or more of, and is not limited to, the following: the location of the UBRCV 104 at a current time, a future location and time at which the UBRCV 104 will be charging or receiving energy from the EV 108, an expected route or path the UBRCV 104 might take to get back to the distribution vehicle for UBRCVs 102 or to the next EV 108. In some examples, the UBRCV 104 location module may generate the location data based on one or more sensors. In some examples, these sensors may include satellite-based navigation systems, radio position finding systems, inertial positioning and surrounding recognition sensors, network-positioning systems, tags and so forth. In some examples, the satellite-based navigation system may include one or more of a Global Positioning System ("GPS") receiver, a global navigation satellite system ("GLONASS") receiver, a Galileo receiver, an Indian Regional Navigational Satellite System, and so forth. In some examples, the location module may also determine the location of any object in the system by receiving information from one or more location sensors such as RFID, NFC sensor, Bluetooth, BLE, LIDAR, acoustic or optical sensors and so forth.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed:

1. A system for energy delivery to an electric vehicle (EV) comprising a rechargeable battery and a wireless charging receiver, the system comprising:
   a plurality of uncrewed battery-recharging vehicles ("UBRCV") each having an energy storage device and a wireless charging transmitter for transferring electric power to the EV; and
   a distribution vehicle for carrying two or more UBRCVs, wherein the system is configured to:
      receive a request for a recharge for the EV, the request comprising at least one of an amount of energy in the rechargeable battery of the EV and a current location of the EV;
      provide the request to a server;
      select a UBRCV from the plurality of UBRCVs to service the request with the selected UBRCV;
      deploy the selected UBRCV from the distribution vehicle near the EV to receive the recharge;
      confirm an identification of the EV to receive the recharge;
      move the selected UBRCV in proximity to the EV to receive the recharge and align the wireless charging transmitter of the UBRCV with the wireless charging receiver of the EV;
      transfer energy from the UBRCV rechargeable battery to the EV;

confirm one or more of: a time duration during which the energy transfer occurred or the amount of energy transferred from the UBRCV to the rechargeable battery of the EV;

move the selected UBRCV in proximity to a different EV to receive energy such that the selected UBRCV is in a position to receive energy from the different EV; and transfer energy from the different EV to the selected UBRCV.

2. The system of claim 1, wherein the system is further configured to conduct a financial transaction based on the transfer of energy from the selected UBRCV rechargeable battery to the EV.

3. The system of claim 2, wherein the financial transaction is conducted at least partially with blockchain.

4. The system of claim 1 wherein the system is configured to send the distribution vehicle to the EV to receive the recharge based on the request.

5. The system of claim 1, wherein the UBRCV is selected based on at least one of: a distance from the UBRCV to the EV, a charging performance of the UBRCV, or a parameter of the request.

6. The system of claim 1,
wherein the UBRCV comprises a marker to assist the UBRCV in finding and aligning with the EV receiver, and
wherein the marker provides information about at least one of the location of the receiver or the positioning of the receiver.

7. An uncrewed battery-recharging vehicle ("UBRCV") for transferring electric power to other electric vehicles (EV), comprising:
a central processing unit coupled to a non-transitory computer readable medium storing instructions for controlling a UBRCV;
an energy storage device;
a wireless charging transmitter configured to transmit energy from the energy storage device to an EV;
an authentication system for receiving information indicative of an identity of the EV;
a propulsion system for moving the UBRCV with respect to the EV;
a sensor configured to detect surrounding obstacles and EVs;
a communication module for receiving information;
a location module for determining the location of the UBRCV;
a battery management unit; and
an energy receiving module configured to receive energy from an external source and store the received energy in the energy storage device,
wherein instructions stored in the non-transitory computer readable medium comprise instructions for the UBRCV to:
move the UBRCV in proximity to a different EV to receive energy such that the selected UBRCV is in a position to receive energy from the different EV; and
transfer energy from the different EV to the UBRCV.

8. The UBRCV of claim 7, wherein the instructions stored in the non-transitory computer readable medium comprise further instructions for the UBRCV to:
receive, using the communication module, a request to transfer energy to an EV;
locate and identify the EV requesting the transfer;
determine a travel path for the UBRCV to the EV, based at least partially on at least one of a location of the EV, a location of a wireless receiver of the EV, or a location of any surrounding obstacles;
navigate and move in proximity to the EV requesting the recharge;
align the wireless charging transmitter with the wireless receiver of the EV; and
transfer energy from the energy storage device of the UBRCV to the EV.

9. The UBRCV of claim 7, wherein the UBRCV includes a movable alignment mechanism configured to increase the efficiency of an energy transfer between the UBRCV and the EV.

10. The UBRCV of claim 7, wherein the UBRCV includes at least one sensor configured to locate the EV and detect a wireless charging receiver of the EV.

11. The UBRCV of claim 7, wherein the UBRCV includes at least one processor connected to the sensors, the processor being configured to perform multiple operations and processes of the UBRCV.

12. The UBRCV of claim 7, wherein the propulsion system comprises a wheel driven by an electric motor integral to the wheel.

13. The UBRCV of claim 7, wherein the authentication system includes an optical sensor configured to receive the information from the EV.

14. The UBRCV of claim 7, wherein the wireless charging transmitter comprises at least one of: an RF wireless transmitter, a laser transmitter, or an inductive charging module.

15. A method for delivering energy to an electric vehicle (EV), comprising:
receiving a request for energy for the EV;
selecting an uncrewed battery-recharging vehicle ("UBRCV") from a plurality of UBRCVs;
deploying the selected UBRCV near the EV to receive energy;
confirming an identification of the EV to receive energy;
moving the selected UBRCV in proximity to the EV to receive energy such that the selected UBRCV is in a position to provide energy to the EV;
transferring energy from the selected UBRCV to the EV;
moving the selected UBRCV in a proximity to a different EV to receive energy such that the selected UBRCV is in a position energy from the different EV; and
transferring energy from the different EV to the selected UBRCV.

16. The method of claim 15, further comprising:
sending a distribution vehicle to the EV to receive energy, the distribution vehicle transporting the plurality of UBRCVs.

17. The method of claim 15, wherein moving the UBRCV in proximity to the EV to receive energy further comprises aligning a wireless charging transmitter of the UBRCV with a wireless charging receiver of the EV.

18. The method of claim 15, further comprising initiating a financial transaction based on the transfer of energy from the UBRCV to the EV.

19. The method of claim 15, further comprising determining a travel path for the selected UBRCV to the EV, based at least partially on at least one of a location of the EV, a location of a wireless receiver of the EV, or a location of any surrounding obstacles.

* * * * *